US012691687B2

(12) United States Patent
Takahashi

(10) Patent No.: US 12,691,687 B2
(45) Date of Patent: Jul. 28, 2026

(54) INKJET PRINTING APPARATUS AND CLEANING METHOD THEREFOR

(71) Applicant: SCREEN Holdings Co., Ltd., Kyoto (JP)

(72) Inventor: Susumu Takahashi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 201 days.

(21) Appl. No.: 18/683,227

(22) PCT Filed: Jul. 13, 2022

(86) PCT No.: PCT/JP2022/027573
§ 371 (c)(1),
(2) Date: Feb. 12, 2024

(87) PCT Pub. No.: WO2023/021889
PCT Pub. Date: Feb. 23, 2023

(65) Prior Publication Data

US 2025/0135782 A1 May 1, 2025

(30) Foreign Application Priority Data

Aug. 19, 2021 (JP) ................................ 2021-134204

(51) Int. Cl.
*B41J 2/165* (2006.01)
*B41J 29/00* (2006.01)

(52) U.S. Cl.
CPC ....... *B41J 2/16517* (2013.01); *B41J 2/16579* (2013.01); *B41J 29/00* (2013.01); *B41J 2002/16573* (2013.01)

(58) Field of Classification Search
CPC . B41J 2/16517; B41J 2/16579; B41J 2/16588
See application file for complete search history.

(56) References Cited

U.S. PATENT DOCUMENTS

2015/0304509 A1 10/2015 Jintsugawa et al.
2016/0221342 A1 8/2016 Tanaka
(Continued)

FOREIGN PATENT DOCUMENTS

JP 2010-208175 A 9/2010
JP 2011-104869 A 6/2011
(Continued)

OTHER PUBLICATIONS

International Search Report received in PCT Application No. PCT/JP2022/027573 dated Sep. 6, 2022.

*Primary Examiner* — Sharon Polk
(74) *Attorney, Agent, or Firm* — Rimon P.C.

(57) ABSTRACT

In an inkjet printing apparatus, cleaning target heads are accurately determined to offer advantages over conventional inkjet printing apparatuses in terms of printing efficiency, quality, and other characteristics. In the inkjet printing apparatus, when cleaning should be started, a cleaning target head determination portion determines any printheads to be cleaning targets as designated heads based on a discharge state detection result (defect information LI) obtained from a printed inspection pattern image. Thereafter, an additional head selection portion selects printheads as additional heads from remaining heads, which are all printheads excluding the designated heads, provided that adding the selected printheads as cleaning targets provides benefits in printing efficiency and quality. A cleaning execution control portion controls a cleaning mechanism to clean the designated heads and the selected additional heads.

16 Claims, 13 Drawing Sheets

(56) References Cited

U.S. PATENT DOCUMENTS

| | | | | |
|---|---|---|---|---|
| 2017/0021631 | A1 | 1/2017 | Ono | |
| 2023/0302835 | A1* | 9/2023 | Arakane | B41J 2/2139 |
| 2023/0382129 | A1* | 11/2023 | Arakane | B41J 2/2139 |

FOREIGN PATENT DOCUMENTS

| | | | |
|---|---|---|---|
| JP | 2013-028134 | A | 2/2013 |
| JP | 2013-043302 | A | 3/2013 |
| JP | 2013-176880 | A | 9/2013 |
| WO | 2015064092 | A9 | 5/2015 |
| WO | 2015/163087 | A1 | 10/2015 |

* cited by examiner

INKJET PRINTING APPARATUS AND CLEANING METHOD THEREFOR

CROSS-REFERENCE TO RELATED APPLICATIONS

This application is the U.S. National Phase under 35 U.S.C. § 371 of International Application No. PCT/JP2022/027573, filed on Jul. 13, 2022, which claims the benefit of foreign priority to Japanese Patent Application No. 2021-134204 filed on Aug. 19, 2021, the entire contents of each of which are hereby incorporated by reference.

TECHNICAL FIELD

The present invention relates to an inkjet printing apparatus and a method for cleaning the same, particularly to determining cleaning target printheads in the inkjet printing apparatus.

BACKGROUND ART

Conventionally, there have been inkjet printing apparatuses known to perform printing by discharging ink onto a base material (printing medium), such as printing paper. In such inkjet printing apparatuses, when discharging occurs at long intervals, solvent evaporation might occur near nozzles during printing, leading to ink drying, air bubble entry into the nozzles, dust adherence to the nozzles, etc. The occurrence of such phenomena can impede normal discharging or other standard operations, resulting in printing defects. Therefore, to avoid such problems, maintenance is performed as needed.

Such maintenance is generally classified into: cleaning printheads (also referred to as "inkjet heads") for ink discharge; and flushing to force printheads to discharge ink unrelated to printing content. Flushing can be executed while printing paper is being conveyed, but cleaning needs to be executed while the conveyance of printing paper is stopped. Accordingly, as the rate of time required for cleaning (cleaning frequency) increases, printing throughput decreases. On the other hand, reducing the cleaning frequency to maintain high printing throughput can result in low-quality printing due to the occurrence of faints and white spots (areas with no ink adherence) in printed images.

In relevance to the inkjet printing apparatus disclosed in the present application, Patent Document 1 describes an inkjet printer that determines which head should be cleaned based on a check pattern printed on printing paper by discharging ink through each head (see FIG. 6, etc., in the document). In this inkjet printer, cleaning is executed on heads that need cleaning (designated heads) determined by the user visually confirming the check pattern printed on the printing paper. Moreover, the check pattern on the printing paper is captured to obtain pattern image data, based on which an evaluation value (regarding discharge failure) is obtained for each head and compared with a threshold value to detect heads that need cleaning and obtain differences between a set of detected heads and a set of designated heads determined by the user, such that a new threshold value to be used in the subsequent processing is acquired based on the differences (threshold value updating) (see paragraph [0039]).

CITATION LIST

Patent Document

Patent Document 1: Japanese Laid-Open Patent Publication No. 2013-176880

SUMMARY OF THE INVENTION

Problems to be Solved by the Invention

In conventional inkjet printing apparatuses, the determination of which printhead needs cleaning (referred to below as a "cleaning target head") is based on information such as the degree of discharge failure (including, for example, what is called nozzle defect) of each printhead, the operating time of each printhead, and changes in printing settings. For example, as described above, the cleaning target head is determined by the operator viewing the check pattern printed on the printing paper, or by a control portion in the inkjet printing apparatus based on detection results for discharge failure (e.g., nozzle defect) obtained from pattern image data acquired by capturing the check pattern.

However, using such a conventional method to determine cleaning target heads might not maintain sufficiently high printing throughput without reducing printing quality below a desired level. On the other hand, simultaneously cleaning other printheads along with the cleaning target heads determined by the conventional method might be more advantageous over the conventional method in terms of printing efficiency (throughput) and quality. However, it is difficult for the user to accurately determine the cleaning target heads by precisely judging which printheads are advantageously cleaned simultaneously with the cleaning target heads, in accordance with settings and situations during a printing operation.

Therefore, it is desired to accurately determine the cleaning target heads in the inkjet printing apparatus in order to become more advantageous than conventional technology in terms of printing efficiency, quality, and other factors.

Solution to the Problems

A first aspect of the present invention provides an inkjet printing apparatus including:

- a conveyance mechanism configured to convey a printing medium;
- a printing portion including a plurality of printheads for discharging ink onto the printing medium;
- a cleaning mechanism capable of selectively cleaning the plurality of printheads;
- a printing execution control portion configured to perform printing on the printing medium by causing the conveyance mechanism to convey the printing medium and causing the printing portion to discharge the ink onto the printing medium;
- a cleaning execution control portion configured to cause the cleaning mechanism to selectively clean the plurality of printheads;
- a cleaning startup portion configured to, when cleaning should be executed, based on discharge state information for the plurality of printheads, output a cleaning start instruction specifying a printhead to be a cleaning target as a designated head; and
- an additional head selection portion configured to, when the cleaning start instruction is outputted, select a printhead to be chosen as a cleaning target along with the designated head as an additional head from remaining heads based on at least one of printer-unique information specifying a cleaning-related configuration or functionality, printing job-related information, dried state information for the remaining heads, a discharge operation history for the remaining heads, and a maintenance history for the remaining heads, the remaining heads being all of the plurality of printheads excluding the designated head, wherein, when the cleaning start instruction is outputted, the printing execution control portion stops the printing on the printing medium until cleaning started by the cleaning start instruction ends, and when the additional head selection portion selects the additional head in response to the cleaning start instruction, the cleaning execution control portion causes the cleaning mechanism to clean the designated head and the additional head.

A second aspect of the present invention provides the inkjet printing apparatus according to the first aspect of the present invention, wherein the additional head selected from the remaining heads by the additional head selection portion is a printhead that enhances either printing efficiency or quality, or both, when the printhead is chosen as the cleaning target along with the designated head.

A third aspect of the present invention provides the inkjet printing apparatus according to the first aspect of the present invention, wherein the additional head selected from the remaining heads by the additional head selection portion, based on the printer-unique information, is a printhead that reduces a cleaning duration when the printhead is included as the cleaning target compared to when only the designated head is cleaned.

A fourth aspect of the present invention provides the inkjet printing apparatus according to the first aspect of the present invention, wherein the additional head selected from the remaining heads by the additional head selection portion, based on the printer-unique information, is a printhead that enhances printing efficiency or quality without increasing a cleaning duration when the printhead is included as the cleaning target compared to when only the designated head is cleaned.

A fifth aspect of the present invention provides the inkjet printing apparatus according to the first aspect of the present invention, wherein the additional head selected from the remaining heads by the additional head selection portion is a printhead that experiences deterioration due to drying when only the designated head is cleaned.

A sixth aspect of the present invention provides the inkjet printing apparatus according to the first aspect of the present invention, wherein the additional head selection portion selects the additional head based on the printing job-related information in accordance with printing settings for a printing job to be executed after the designated head is cleaned.

A seventh aspect of the present invention provides the inkjet printing apparatus according to the first aspect of the present invention, wherein, further including a history information memory portion configured to accumulate information specifying at least one of histories of maintenance, discharge operation, and discharge failure inspection, for each of the plurality of printheads, wherein, the additional head selection portion selects the additional head from the remaining heads based on the information accumulated in the history information memory portion.

A eighth aspect of the present invention provides the inkjet printing apparatus according to the first aspect of the present invention, wherein, when the printing portion includes printheads of different colors and the cleaning mechanism is capable of cleaning printheads of the same color as a unit, the additional head selection portion selects the additional head from the remaining heads based on the printer-unique information within a range where the selected additional head does not require a longer cleaning duration than a printhead of a color that demands the longest cleaning duration among all of the designated heads.

A ninth aspect of the present invention provides a method for cleaning an inkjet printing apparatus that prints on a printing medium using a plurality of printheads discharging ink onto the printing medium being conveyed, the method comprising:

a cleaning startup step of, when cleaning should be executed, based on discharge state information for the plurality of printheads, outputting a cleaning start instruction specifying a printhead to be a cleaning target as a designated head; and an additional head selection step of, when the cleaning start instruction is outputted, selecting a printhead to be chosen as a cleaning target along with the designated head as an additional head from remaining heads based on at least one of printer-unique information specifying a cleaning-related configuration or functionality, printing job-related information, dried state information for the remaining heads, a discharge operation history for the remaining heads, and a maintenance history for the remaining heads, the remaining heads being all of the plurality of printheads excluding the designated head, and a cleaning execution step of, when the additional head is selected in response to the cleaning start instruction, cleaning the designated head and the additional head.

Other aspects of the present invention are apparent from the above-described aspects of the present invention and the description of embodiments and variants thereof described below, and therefore not be elaborated upon.

Effects of the Invention

In the first aspect of the present invention, when cleaning should be executed, based on the discharge state information for the printheads in the printing portion, a cleaning start instruction is outputted to specify a printhead to be a cleaning target as a designated head. Once the cleaning start instruction is outputted, a printhead to be chosen as a cleaning target along with the designated head is selected as an additional head from the remaining heads, i.e., all of the printheads excluding the designated head, based on at least one of the following: the printer-unique information specifying the cleaning-related configuration or functionality; the printing job-related information; the dried state information for the remaining head; the discharge operation history for the remaining heads; and the maintenance history for the remaining heads. Thereafter, the designated head and the additional head are cleaned while printing on the printing medium is paused. In this manner, the inkjet printing apparatus cleans both the designated head and the additional head, which is selected based on the cleaning-related information. This offers benefits (e.g., enhanced printing efficiency and quality) compared to when only the designated head is cleaned. Moreover, the selection of the additional head is automated and based on the cleaning-related information, including the printer-unique information, the printing job-related information, the discharge operation history, and the maintenance history. This ensures accurate selection of the additional head to be included as the cleaning target, without relying on human skills and similar qualities.

For example, in the third aspect of the present invention, the printhead selected as the additional head from the remaining heads reduces the cleaning duration when the printhead is included as the cleaning target compared to when only the designated head is cleaned. This reduction in the cleaning duration leads to enhanced printing efficiency (throughput).

Furthermore, for example, in the fifth aspect of the present invention, the printhead selected as the additional head from the remaining heads experiences deterioration due to drying when only the designated head is cleaned. Therefore, the selected printhead is maintained in a satisfactory state, leading to a reduction in cleaning frequency and consequently ensuring the maintenance of high printing efficiency and quality.

Furthermore, in the sixth aspect of the present invention, the additional head is selected in accordance with printing settings for a printing job to be executed after the designated head is cleaned, and therefore, in the subsequent job, printing is performed in conformity with the printing settings (including sheet width and type and printing quality requirements), ensuring the maintenance of high printing efficiency and quality.

Furthermore, in the seventh aspect of the present invention, the additional head is selected based on the information specifying at least one of the following histories for each of the printheads: maintenance; discharge operation; and discharge failure inspection, and therefore, each printhead is maintained in a satisfactory state, leading to a reduction in cleaning frequency and consequently ensuring the maintenance of high printing efficiency and quality.

Furthermore, in the eighth aspect of the present invention, when the printing portion includes printheads of different colors and the cleaning mechanism is capable of cleaning printheads of the same color as a unit, the additional head is selected from the remaining heads within a range where the selected additional head does not require a longer cleaning duration than a printhead of a color that demands the longest cleaning duration among all of the designated heads. This allows an inkjet printing apparatus capable of color printing to maintain each printhead in a satisfactory state, leading to a reduction in cleaning frequency and consequently ensuring the maintenance of high printing throughput.

Furthermore, the ninth aspect of the present invention renders it possible to achieve effects similar to those achieved by the first aspect of the present invention.

The effects of the other aspects of the present invention can be inferred from the descriptions regarding the effects of the above aspects of the invention, as well as from the descriptions of the following embodiment and variants thereof, and therefore will not be elaborated upon.

MODE FOR CARRYING OUT THE INVENTION

Hereinafter, an embodiment of the present invention will be described with reference to the accompanying drawings.

<1. Overall Configuration of Print System>

Figure 1:
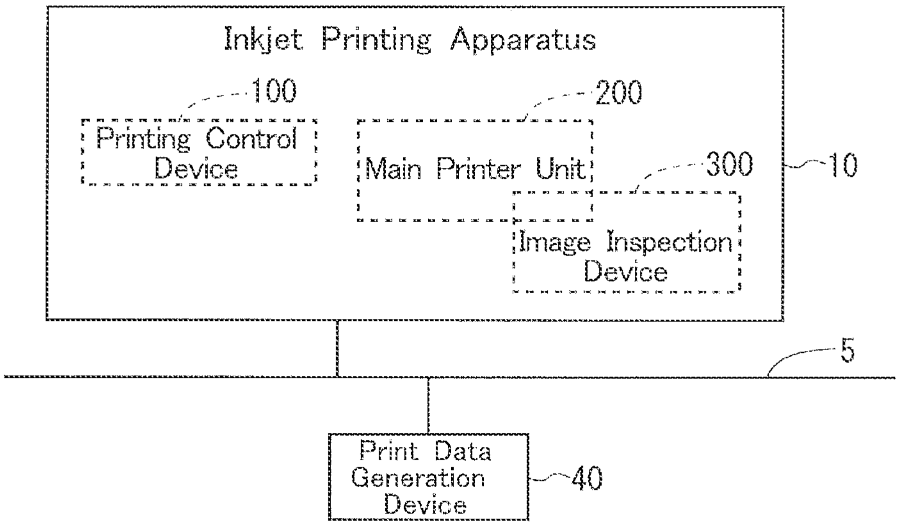
FIG. 1 is an overall configuration diagram of a print system according to an embodiment of the present invention.

FIG. 1 is an overall configuration diagram of a print system according to an embodiment of the present invention. The print system includes an inkjet printing apparatus 10 and a print data generation device 40. The inkjet printing apparatus 10 and the print data generation device 40 are connected to each other via a communication line 5. The print data generation device 40 generates print data by performing RIP processing and the like on manuscript data, such as a PDF file. The print data generated by the print data generation device 40 is transmitted to the inkjet printing apparatus 10 via the communication line 5. Based on the print data transmitted from the print data generation device 40, the inkjet printing apparatus 10 prints an image on printing paper, which serves as a printing medium. The inkjet printing apparatus 10 includes a main printer unit 200, a printing control device 100 for controlling the operation of the main printer unit 200, and an image inspection device 300 for inspecting print conditions. That is, the inkjet printing apparatus 10 is a printing apparatus with an inspection function. Some components of the image inspection device 300 are integrated into the main printer unit 200.

It should be noted that in the configuration shown in FIG. 1, the image inspection device 300 is a component of the inkjet printing apparatus 10 (i.e., the image inspection device 300 is included in the inkjet printing apparatus 10), but this is not limiting. The image inspection device 300 may be a device independent of the inkjet printing apparatus 10.

<2. Configuration of Inkjet Printing Apparatus>

Figure 2:
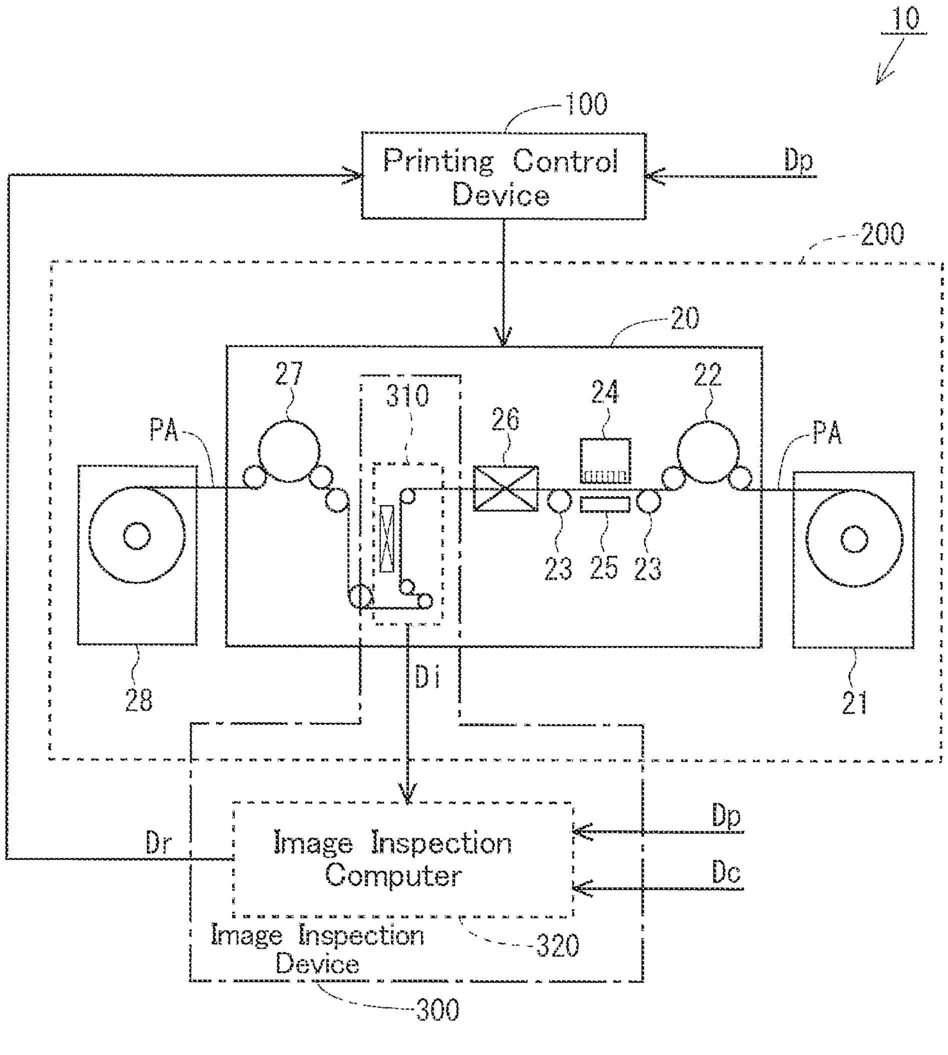
FIG. 2 is a schematic diagram illustrating a configuration example of an inkjet printing apparatus in the embodiment.

FIG. 2 is a schematic diagram illustrating a configuration example of the inkjet printing apparatus 10. As described above, the inkjet printing apparatus 10 includes the printing control device 100, the main printer unit 200, and the image inspection device 300.

The main printer unit 200 includes a paper feeding portion 21 for supplying printing paper (e.g., a roll of paper) PA serving as a printing medium, a printing mechanism 20 for printing on the printing paper PA, and a paper winding portion 28 for winding the printing paper PA after printing. The printing mechanism 20 includes a first drive roller 22 for conveying the printing paper PA inside, a plurality of support rollers 23 for conveying the printing paper PA within the printing mechanism 20, a printing portion 24 for performing printing by discharging ink onto the printing paper PA, a cleaning mechanism 25 for cleaning the printing portion 24 (for example, through purging by ink suction from nozzles to be described later or through nozzle face wiping), a drying portion 26 for drying the printing paper PA after printing, an imaging portion 310 for capturing a printed image (the printing paper PA after printing), and a second drive roller 27 for ejecting the printing paper PA from inside the printing mechanism 20. The imaging portion 310, which is a component of the image inspection device 300, is an image sensor, such as a CCD or a CMOS.

The printing control device 100 controls the operation of the main printer unit 200 configured as described above. When the printing control device 100 is provided with an instruction command to output a print, the printing control device 100 controls the operation of the main printer unit 200 such that the printing paper PA is conveyed from the paper feeding portion 21 to the paper winding portion 28. While the printing paper PA is being conveyed in such a manner, the printing portion 24 initially prints on the printing paper PA, the drying portion 26 then dries the printing paper PA, and the imaging portion 310 finally captures the printed image. Moreover, if necessary, the cleaning mechanism 25 cleans the printing portion 24.

The image inspection device 300 includes the imaging portion 310 and an image inspection computer 320. The imaging portion 310 obtains captured image data Di by capturing the printed image, and the captured image data Di is sent to the image inspection computer 320. The image inspection computer 320 conducts an inspection by analyzing the captured image data Di to detect defects (faults). Note that without being bound by such an approach, an inspection or similar process for detecting defects (faults) may be performed by comparing the captured image data Di with print data Dp transmitted from the print data generation device 40. Alternatively, an inspection or similar process for detecting defects (faults) may be performed by printing an inspection pattern using previously prepared inspection image data Dc and then comparing the inspection image data Dc with captured image data Di obtained by capturing the printed image. The image inspection computer 320 obtains inspection results Dr, which are sent to the printing control device 100.

Figure 3:
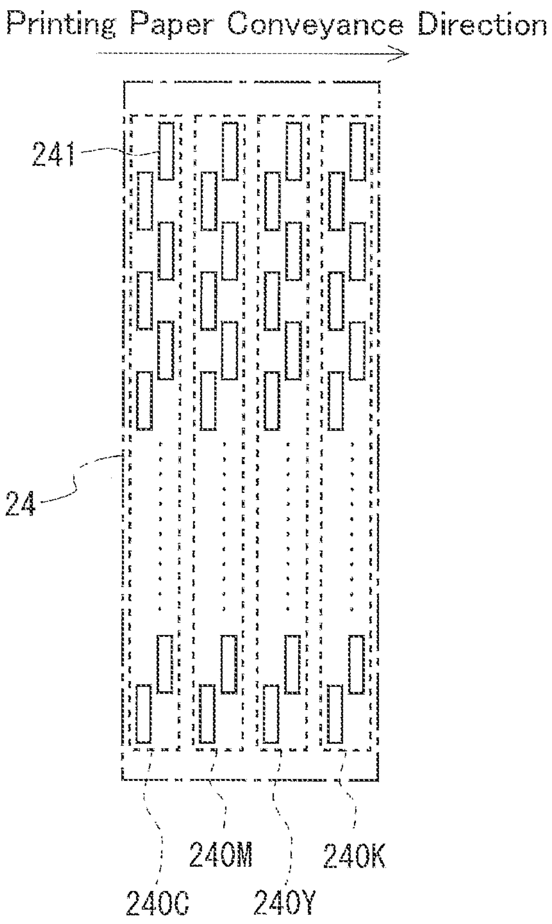
FIG. 3 is a plan view illustrating a configuration example of a printing portion in the embodiment.

FIG. 3 is a plan view illustrating a configuration example of the printing portion 24. As shown in FIG. 3, the printing portion 24 includes printhead arrays arranged in a conveyance direction of the printing paper PA in the following order: 240C for color C (cyan), 240M for color M (magenta), 240Y for color Y (yellow), and 240K for color K (black). Each printhead array includes a plurality of printheads 241 arranged in a staggered manner. Each printhead 241 includes a large number of ink-discharging nozzles. Each nozzle of the printheads 241 included in the printhead array 240C for color C discharges C-ink. Each nozzle of the printheads 241 included in the printhead array 240M for color M discharges M-ink. Each nozzle of the printheads 241 included in the printhead array 240Y for color Y discharges Y-ink. Each nozzle of the printheads 241 included in the printhead array 240K for color K discharges K-ink.

While the configuration of the inkjet printing apparatus 10 for color printing is described here as an example, the present invention is also applicable to cases where inkjet printing apparatuses for monochrome printing are employed. Moreover, the configuration of the inkjet printing apparatus 10 described here uses watercolor ink, but the present invention is also applicable to cases where inkjet printing apparatuses using UV ink (ultraviolet-curable ink), such as those used for label printing, are employed. Therefore, there are no specific limitations on the types of printing apparatuses, so long as the printing portion that needs cleaning is included.

<3. Hardware Configuration of Printing Control Device>

Figure 4:
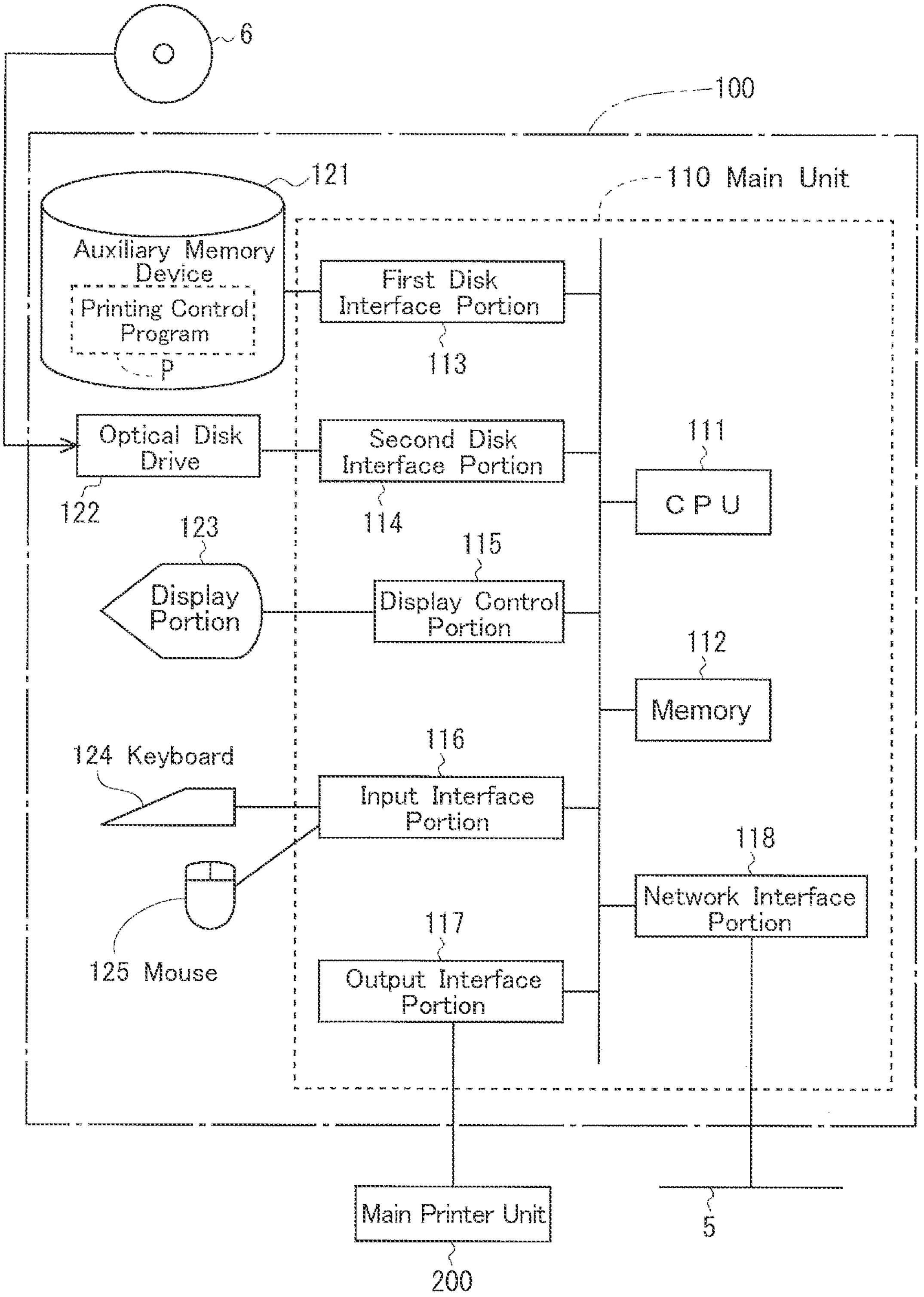
FIG. 4 is a block diagram illustrating the hardware configuration of a printing control device in the embodiment.

FIG. 4 is a block diagram illustrating the hardware configuration of the printing control device 100. As shown in FIG. 4, from a hardware perspective, the printing control device 100 is a computer including a main unit 110, an auxiliary memory device 121, an optical disk drive 122, a display portion 123, a keyboard 124, a mouse 125, etc. The main unit 110 includes a CPU 111, memory 112, a first disk interface portion 113, a second disk interface portion 114, a display control portion 115, an input interface portion 116, an output interface portion 117, and a network interface portion 118. The CPU 111, the memory 112, the first disk interface portion 113, the second disk interface portion 114, the display control portion 115, the input interface portion 116, the output interface portion 117, and the network interface portion 118 are connected to one another via a system bus. The first disk interface portion 113 is connected to the auxiliary memory device 121. The second disk interface portion 114 is connected to the optical disk drive 122. The display control portion 115 is connected to the display portion (display device) 123. The input interface portion 116 is connected to the keyboard 124 and the mouse 125. The output interface portion 117 is connected to the main printer unit 200 via a communication cable. The network interface portion 118 is connected to the communication line 5. The auxiliary memory device 121 is a magnetic disk device or suchlike. The optical disk drive 122 accepts insertion of an optical disk 6, which is a computer-readable recording medium, such as a CD-ROM or a DVD-ROM. The display portion 123 is a liquid crystal display or suchlike. The display portion 123 is used for displaying user desired information. The keyboard 124 and the mouse 125 are used as an operation portion for user instructions to the printing control device 100.

The auxiliary memory device 121 has stored therein a printing control program P (the program for controlling the execution of a printing process by the main printer unit 200). The CPU 111 reads the printing control program P stored in the auxiliary memory device 121 therefrom into the memory 112 and executes the printing control program P, thereby realizing various functions of the printing control device 100. The memory 112 includes a RAM and a ROM. The memory 112 functions as a work area for the CPU 111 to execute the printing control program P stored in the auxiliary memory device 121. Note that the printing control program P is provided in a format that is stored on the computer-readable recording medium (non-transient recording medium). Specifically, the user purchases, for example, an optical disk 6, which is a medium that has the printing control program P recorded thereon, and inserts the optical disk 6 into the optical disk drive 122, with the result that the printing control program P is read from the optical disk 6 and installed in the auxiliary memory device 121. Alternatively, the printing control program P may be transmitted via the communication line 5, received by the network interface portion 118, and installed in the auxiliary memory device 121.

<4. Control Portion>

<4.1 General Configuration>

Figure 5:
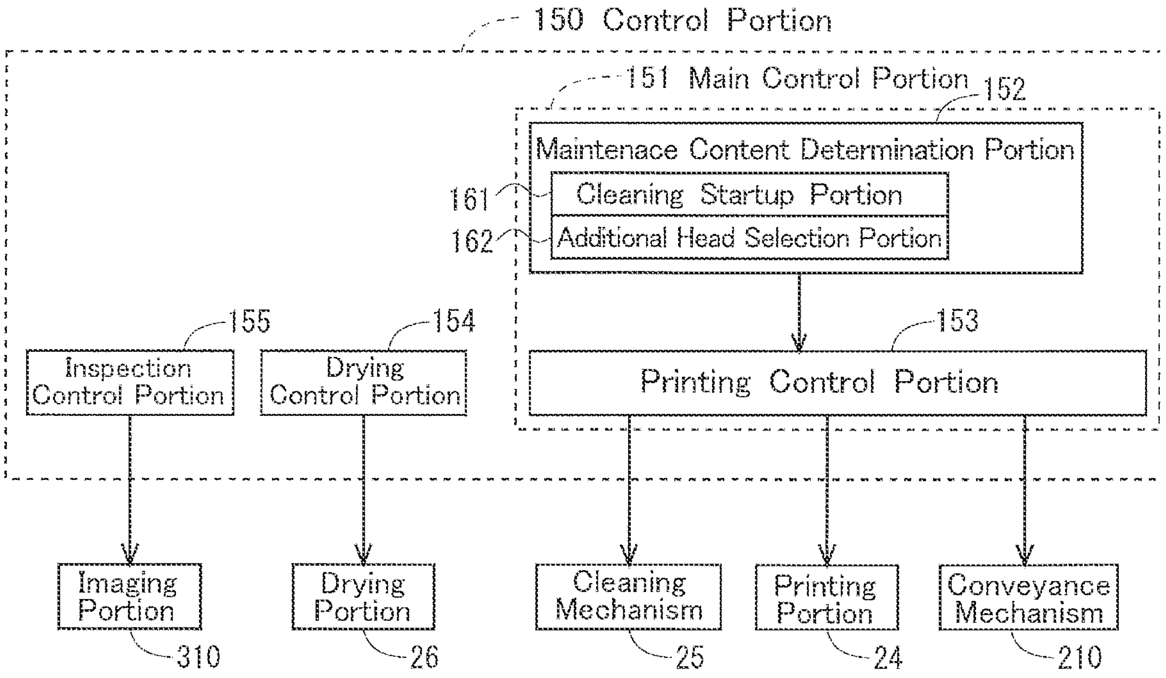
FIG. 5 is a block diagram illustrating a general functionality configuration of a control portion in the embodiment.

FIG. 5 is a block diagram illustrating a general functionality configuration of the control portion 150 implemented by the printing control device 100 executing the printing control program P. The control portion 150 includes a main control portion 151, a drying control portion 154, and an inspection control portion 155. The main control portion 151 includes a maintenance content determination portion 152 and a printing control portion 153.

The maintenance content determination portion 152 determines the contents of maintenance for each printhead (also referred to below simply as "head") 241 in the printing portion 24 based on results of inspection conducted by the image inspection device 300 (i.e., inspection results Dr obtained by the image inspection computer 320). As will be described below, the maintenance content determination portion 152 determines whether cleaning is necessary when maintenance is required, and if cleaning is necessary, determines which printhead 241 should be a cleaning target. To this end, the maintenance content determination portion 152 includes a cleaning startup portion 161 and an additional head selection portion 162.

The printing control portion 153 controls the printing portion 24 and a conveyance mechanism 210. As mentioned earlier, the printing portion 24 includes the printheads (inkjet heads) 241, each including a large number of nozzles (see FIG. 3). In the present embodiment, the conveyance mechanism 210 is implemented by the paper feeding portion 21, the first drive roller 22, the support rollers 23, the second drive roller 27, and the paper winding portion 28 (see FIG. 2). When maintenance is performed on the printing portion 24, the printing control portion 153 controls the operations of the printing portion 24 and the cleaning mechanism 25 in accordance with the contents of maintenance determined by the maintenance content determination portion 152.

The drying control portion 154 controls the temperature (drying temperature) at which the drying portion 26 dries the printing paper PA. The inspection control portion 155 controls the timing for the imaging portion 310 to capture printed images.

<4.2 Configuration of Cleaning-Related Section in Main Control>

Figure 6:
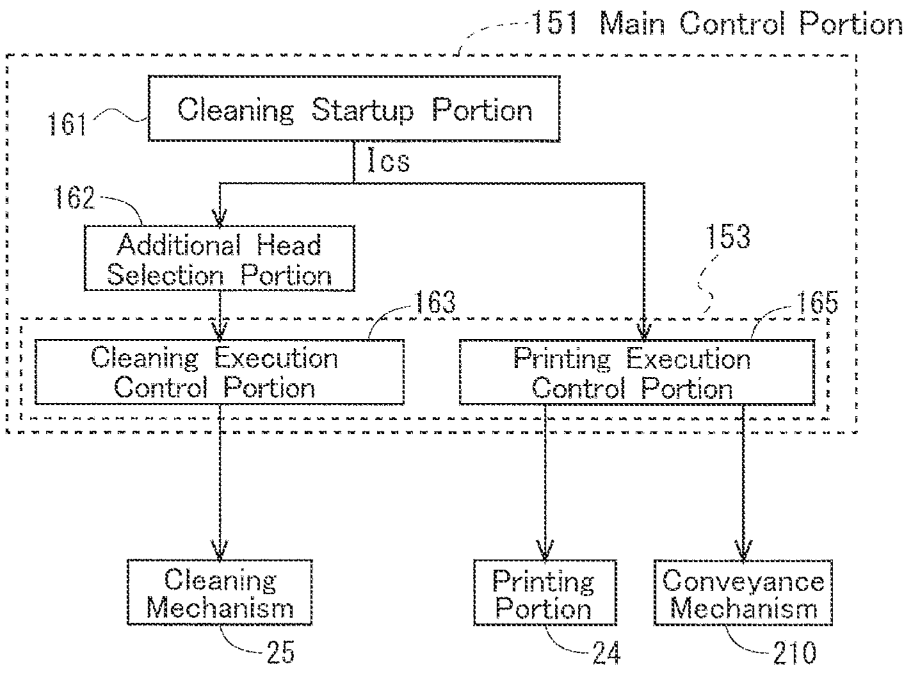
FIG. 6 is a block diagram illustrating a general configuration of a cleaning-related section in a main control portion in the embodiment.

FIG. 6 is a block diagram illustrating a general configuration of a cleaning-related section in the main control portion 151 in the present embodiment. As the components of the cleaning-related section, the main control portion 151 includes the cleaning startup portion 161, the additional head selection portion 162, a cleaning execution control portion 163, and a printing execution control portion 165, and the cleaning execution control portion 163 and the printing execution control portion 165 constitute the previously described printing control portion 153.

The cleaning startup portion 161 determines whether cleaning is necessary, at predetermined times to be described later, and if cleaning is necessary, the cleaning startup portion 161 determines printheads to be cleaned (hereinafter, "designated heads"), namely, cleaning targets, and outputs a cleaning start instruction Ics. When the cleaning start instruction Ics is outputted, the additional head selection portion 162 selects printheads to be added as cleaning targets (referred to below as "additional heads"). Once additional heads are selected, the cleaning execution control portion 163 controls the cleaning mechanism 25 to clean both the designated heads and the additional heads from among the printheads 241 in the printing portion 24. On the other hand, when printing is performed based on print data Dp from the print data generation device 40, the printing execution control portion 165 controls the printing portion 24 and the conveyance mechanism 210 to form a printed image as specified by the print data Dp on the printing paper PA, and once the cleaning start instruction Ics is outputted, the printing execution control portion 165 stops the conveyance mechanism 210 from conveying the printing paper PA (if the conveyance of the printing paper PA has already been stopped at the time of the output of the cleaning start instruction Ics, the stopped state is maintained).

Figure 7:
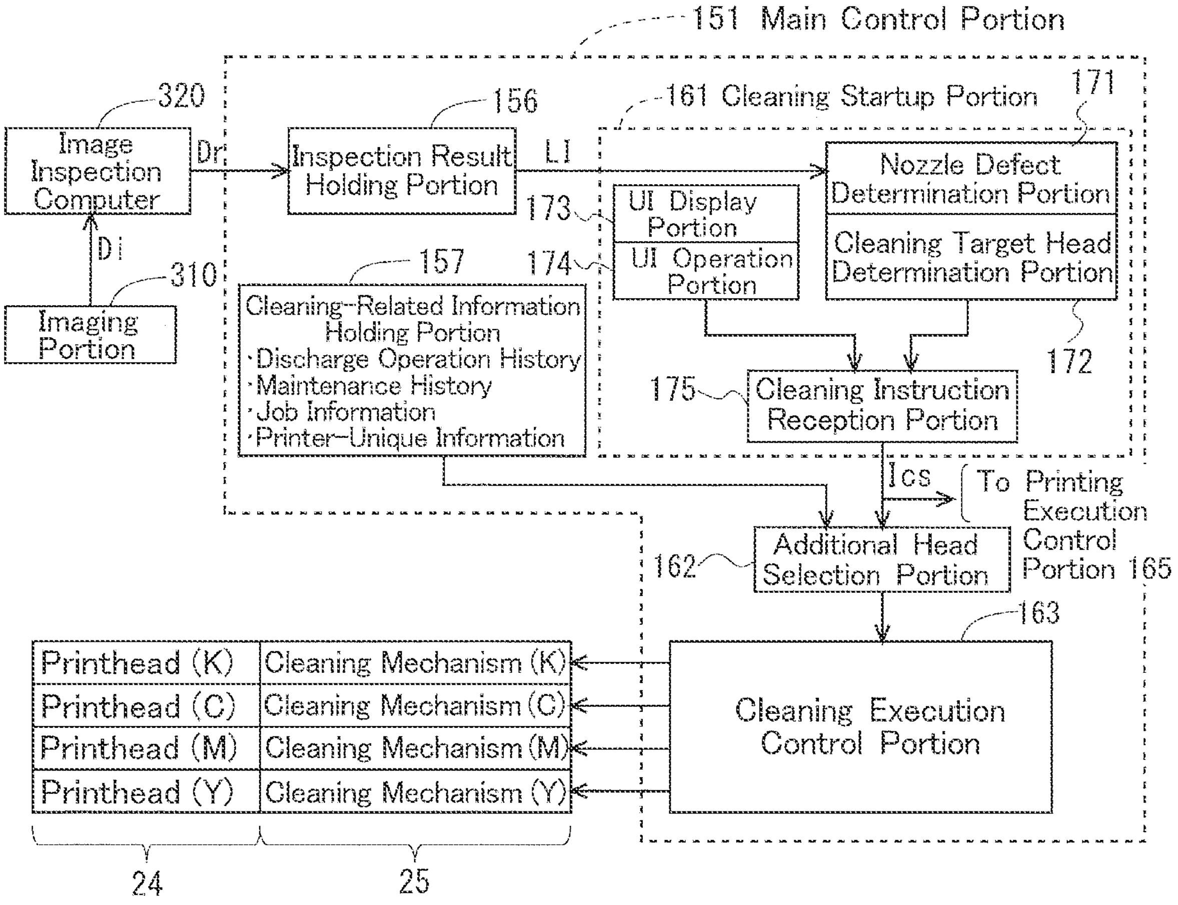
FIG. 7 is a block diagram illustrating in detail the configuration of the cleaning-related section in the main control portion in the embodiment.

FIG. 7 is a block diagram illustrating in detail the configuration of the cleaning-related section in the main control portion 151 in the present embodiment. In addition to the cleaning startup portion 161, the additional head selection portion 162, and the cleaning execution control portion 163, the main control portion 151 also includes an inspection result holding portion 156 and a cleaning-related information holding portion 157. Moreover, as shown in FIG. 7, the cleaning startup portion 161 includes a nozzle defect determination portion 171, a cleaning target head determination portion 172, a UI display portion 173, a UI operation portion 174, and a cleaning instruction reception portion 175.

The inspection result holding portion 156 holds inspection results Dr sent from the image inspection computer 320. The maintenance content determination portion 152 utilizes defect information LI, which is an inspection result related to defects (faults) such as nozzle defects, included in the inspection results Dr sent from the image inspection computer 320. In the cleaning startup portion 161, based on the defect information LI, the nozzle defect determination portion 171 determines the degree of nozzle defects for each printhead, and the cleaning target head determination portion 172 determines whether cleaning is necessary and determines which printhead to be chosen as a cleaning target, i.e., a designated head, from among the printheads in the printing portion 24. If it is determined that cleaning is necessary and designated heads, namely, cleaning targets, are determined, the cleaning target head determination portion 172 sends a cleaning instruction, which specifies this information, to the cleaning instruction reception portion 175.

In the present embodiment, on the other hand, it is also possible for the user to determine whether cleaning is necessary and designate cleaning target printheads through the UI display portion 173 and the UI operation portion 174. Specifically, the UI display portion 173 displays the defect information LI either alone or in combination with other information, such as a cleaning history or a discharge operation history for each printhead 241, so that the user can designate cleaning target printheads through input operations on the UI operation portion 174 while viewing the information displayed on the UI display portion 173. If the user determines that cleaning is necessary and determines designated heads, namely, cleaning targets, the UI operation portion 174 sends a cleaning instruction, which specifies this information, to the cleaning instruction reception portion 175.

Upon reception of the cleaning instruction from the cleaning target head determination portion 172 or the UI operation portion 174, the cleaning instruction reception portion 175 outputs a cleaning start instruction Ics, along with information that specifies the designated heads. The cleaning start instruction Ics is sent to the additional head selection portion 162. Note that as described earlier, the cleaning start instruction Ics is also sent to the printing execution control portion 165 (see FIG. 6).

Upon reception of the cleaning start instruction Ics, the additional head selection portion 162 selects printheads to be added as cleaning targets, namely, additional heads, from among all printheads excluding the designated heads (referred to below as "remaining heads") in the printing portion 24, based on information being held in the cleaning-related information holding portion 157. Information that specifies the selected additional heads, along with the information that specifies the designated heads, is sent to the cleaning execution control portion 163.

The information being held in the cleaning-related information holding portion 157 (referred to below as the "cleaning-related information") is all the information, excluding the defect information LI, that is useful for determining for each printhead 241 whether to choose the printhead 241 as a cleaning target. In the present embodiment, the following cleaning-related information is accumulated in the cleaning-related information holding portion 157: discharge histories; maintenance histories (including discharge failure inspection histories); job information, which is printing job-related information (such as information about the subsequent job); and printer-unique information (information that specifies the configuration of the cleaning-related section, including the printing portion 24, and cleaning-related functionality), but the cleaning-related information that is to be used for additional head selection is not limited to the above. Among the cleaning-related information, the history information is updated by the control portion 150 in response to execution of printing and maintenance (including cleaning) operations. Note that details of additional head selection will be described later.

The cleaning mechanism 25 is capable of selectively cleaning the printheads 241 in the printing portion 24. The cleaning execution control portion 163 controls the cleaning mechanism 25 based on the information sent from the additional head selection portion 162 such that the cleaning mechanism 25 cleans the designated heads and the additional heads among the printheads 241 in the printing portion 24. Note that in the present embodiment, the cleaning mechanism 25 is capable of not only individually cleaning each printhead but also collectively cleaning a plurality of printheads (for example, printheads of the same color) as a set.

<5. Maintenance Control>

In the inkjet printing apparatus 10 according to the present embodiment, maintenance of the printing portion 24 is performed based on the results of inspection conducted by the image inspection device 300. In this regard, in the present embodiment, the process of determining whether maintenance is necessary and choosing the type of maintenance needed (referred to below as the "maintenance content determination process") is performed after each printing job. Thereafter, in accordance with the outcome of the maintenance content determination process, the printing control portion 153 controls the operations of the printing portion 24 and the cleaning mechanism 25 to maintain the printing portion 24 in a desired manner.

Figure 8:
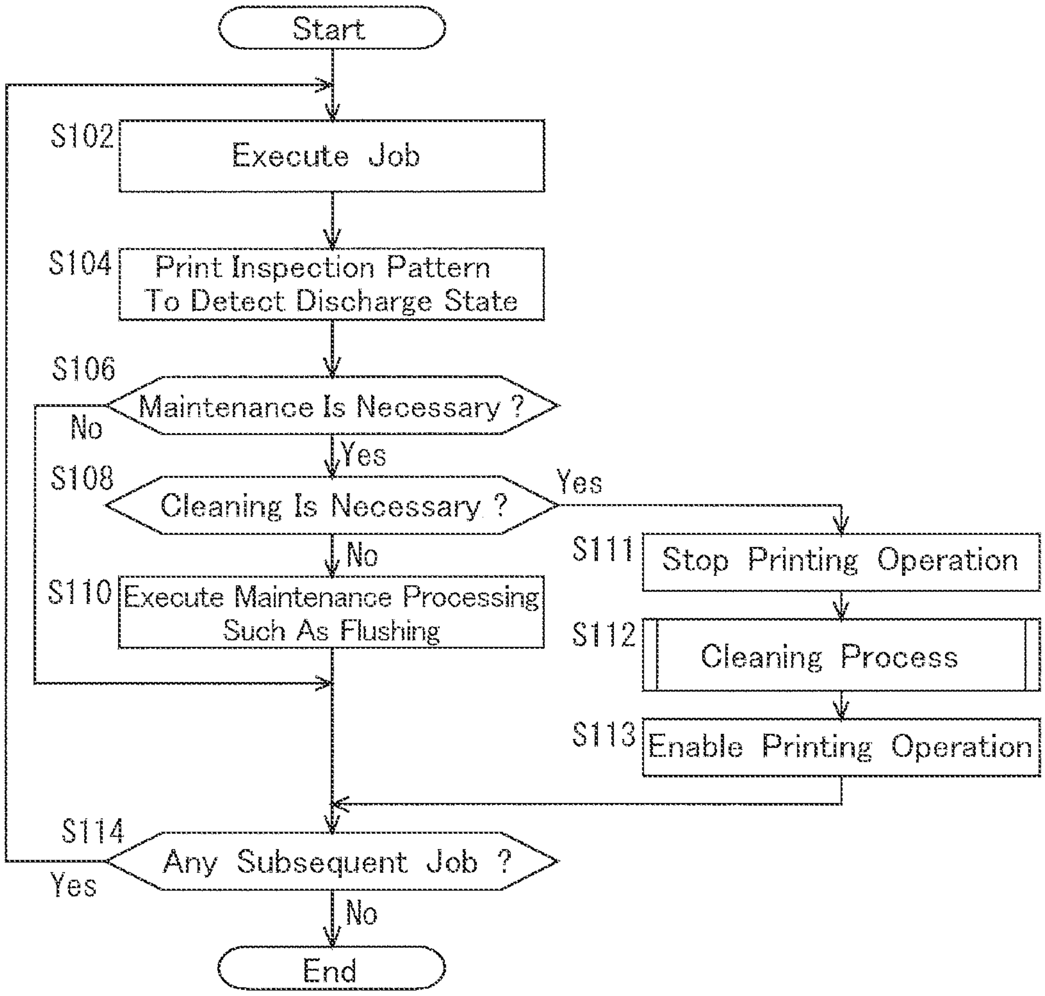
FIG. 8 is a flowchart describing an example of an operational maintenance procedure in the embodiment.

FIG. 8 is a flowchart describing an example of the operational maintenance procedure in the present embodiment. Each time the inkjet printing apparatus 10 according to the present embodiment receives print data corresponding to manuscript data from the print data generation device 40, the auxiliary memory device 121 in the printing control device 100 memorizes job information along with the print data, thereby registering a printing job (also referred to below simply as a "job") (see FIGS. 1 and 4). The job information includes printing setting data specifying various printing settings (for example, resolution, paper size, and the number of pages). In the present embodiment, a plurality of jobs can be accepted successively and are processed sequentially in the order of acceptance. During this course, the CPU 111 in the printing control device 100 executes the process outlined by the flowchart in FIG. 8. Specifically, the CPU 111 operates as described below in accordance with the printing control program P.

When each job is processed, the operation of the conveyance mechanism 210 is initially controlled to start conveying the printing paper PA from a standstill. The speed of conveyance is gradually increased and then maintained constantly at a preset reference speed (the speed being suitable for printing). The operation of the printing portion 24 is controlled to print on the printing paper PA in accordance with print data for the job, while the speed of conveyance is maintained at the reference speed (i.e., the printing paper PA is being conveyed at a constant speed).

In this manner, the first of the jobs is executed. Specifically, printing is performed in accordance with print data Dp for the first job (step S102).

After the job is complete, the printing portion 24 and the conveyance mechanism 210 are controlled to print a predetermined inspection pattern on the printing paper PA, and the state of discharge is detected for each printhead 241 based on the printed image of the inspection pattern (step S104). Specifically, under control of the CPU 111, the imaging portion 310 captures the printed image of the inspection pattern, and the image inspection computer 320 performs image analysis on captured image data Di obtained by the capturing. The result of the image analysis is held as an inspection result Dr in either the auxiliary memory device 121 or the memory 112, serving as the inspection result holding portion 156.

Next, it is determined whether maintenance is necessary based on defect information LI, which is an inspection result related to defects (faults), such as nozzle defects, included as an inspection result Dr (step S106). When the determination result indicates that no maintenance is necessary, the procedure advances to step S114, and when maintenance is necessary, it is determined whether cleaning is necessary based on the defect information LI (step S108).

As described earlier, whether cleaning is necessary is automatically determined by the CPU 111 or manually instructed by the user based on their determination (see FIG. 7). In the former case, the CPU 111 executes a predetermined routine from the printing control program P and thereby implements the nozzle defect determination portion 171 in software to determine whether cleaning is necessary.

In the latter case, the user manually operates the keyboard 124 and the mouse 125 to instruct on whether cleaning is necessary while referring to information displayed on the display portion 123. In this case, the user instructs on whether cleaning is necessary using the previously described UI display portion 173 and UI operation portion 174, which are implemented in software by the CPU 111 executing another predetermined routine from the printing control program P.

When it is determined at step S108 that no cleaning is necessary (including the case where the user instructs that no cleaning is necessary), flushing or other maintenance tasks, excluding cleaning, are executed (step S110), and the procedure then advances to step S114. On the other hand, when it is determined at step S110 that cleaning is necessary (including the case where the user instructs that cleaning is necessary), the printing portion 24 and the conveyance mechanism 210 are controlled to stop the printing operation (when the printing operation has already been stopped upon the determination that cleaning is necessary, the stopped state is maintained) (step S111), and the cleaning process is executed (step S112). Once the cleaning process ends, the printing operation is enabled (step S113), and the procedure advances to step S114.

At step S114, it is determined whether there is any subsequent job based on the job-related information (job information) registered in the auxiliary memory device 121. When the determination result indicates the presence of a subsequent job, the procedure returns to step S102, and processing from step S102 onward is executed for the subsequent job. If there is no more subsequent jobs, the printing operation ends.

<5.1 Example of Cleaning Process>

Figure 9:
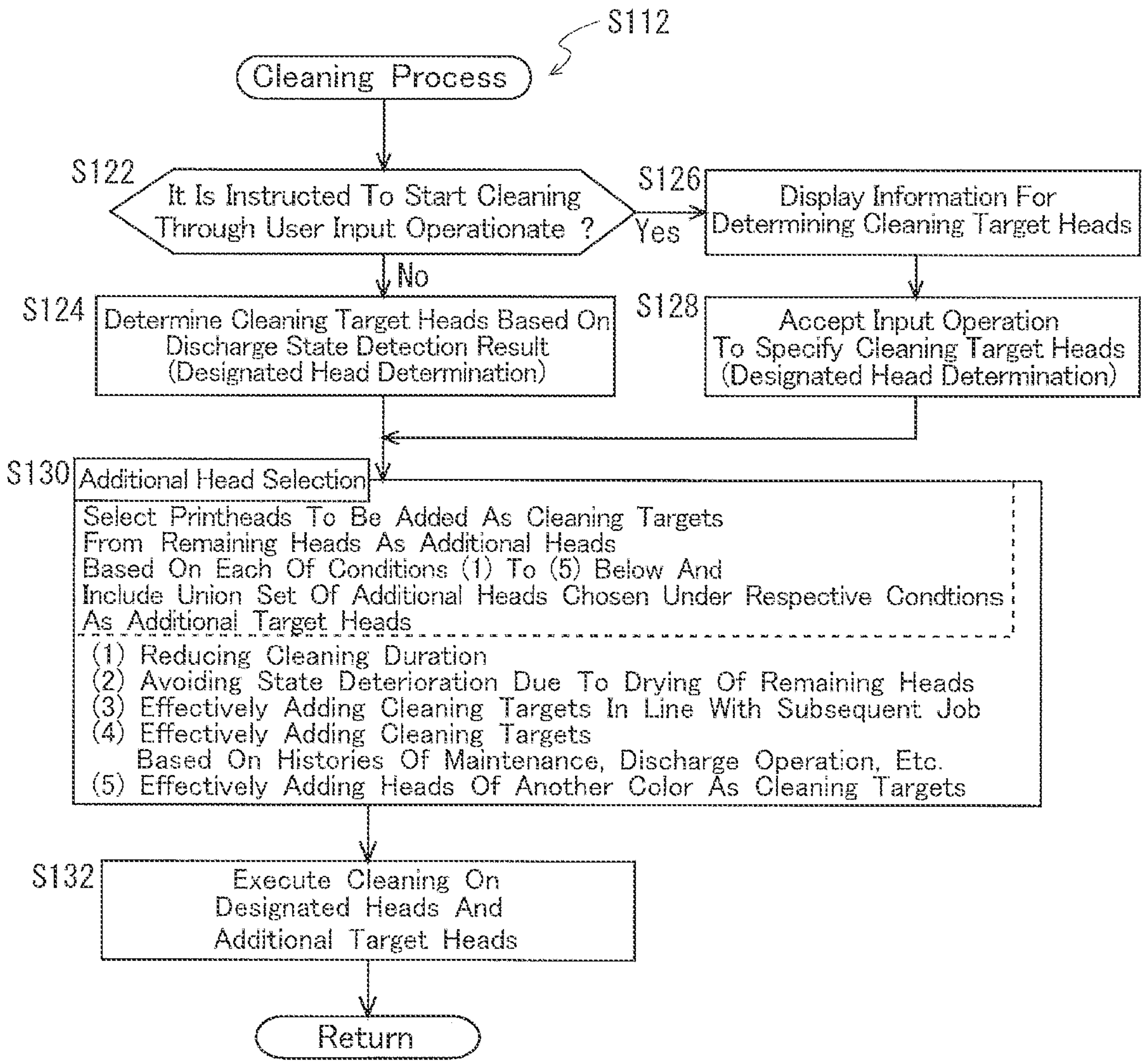
FIG. 9 is a flowchart illustrating an example of a cleaning process in the embodiment.

FIG. 9 is a flowchart illustrating the procedure of an example of the cleaning process in the present embodiment, as indicated at step S112 of the flowchart in FIG. 8. In this cleaning process, the CPU 111 operates as described below in accordance with a predetermined routine from the printing control program P.

Initially, it is determined whether the user started the cleaning process through input operations (step S122), and when it is determined that the user's input operations started the process, the procedure advances to step S126, where the display portion 123 (i.e., the UI display portion 173) displays information to be used for determining designated heads, namely, printheads to be cleaning targets (step S126). In this example, the information displayed on the display portion 123 is the defect information LI specifying the discharge state for each printhead 241. On the basis of the defect information, the user determines the designated heads, namely, the cleaning targets, and once the user indicates the designated heads through input operations, the input operations are accepted (step S128).

When the determination result at step S122 indicates that the cleaning process was started without the user's input operations, the designated heads, namely, the cleaning target printheads, are determined based on the defect information LI specifying the discharge state for each printhead 241 (step S124). In other words, the CPU 111 automatically determines the designated heads through software processing.

Once the designated heads, namely, the cleaning targets, are determined at step S124 or S128, as described above, printheads to be chosen as cleaning targets along with the designated heads are then selected as additional heads from among all printheads excluding the designated heads (i.e., remaining heads) in the printing portion 24 based on the previously described cleaning-related information being held in the auxiliary memory device 121 serving as the cleaning-related information holding portion 157 (see FIG. 7) (step S130). Here, the additional heads are selected based on whether choosing the additional heads as the cleaning targets along with designated heads benefits the inkjet printing apparatus. Basically, the selection is carried out based on whether including the additional heads as the cleaning targets enhances the printing throughput or quality of the printing apparatus. Specifically, in the present embodiment, additional heads to be added as cleaning targets are selected from the remaining heads for each of Conditions 1 to 5 below, and the union set of additional heads chosen based on the respective Conditions 1 to 5 is included as additional target heads. The cleaning-related information mentioned above includes information to be used to determine whether each of Conditions 1 to 5 below is satisfied.

(Condition 1): When the printhead is chosen as the cleaning target along with the designated heads, the cleaning duration is reduced compared to when only the designated heads are chosen as the cleaning targets.

(Condition 2): The printhead's discharge state deteriorates due to drying when cleaning is targeted only for the designated heads.

(Condition 3): The printhead should be added as the cleaning target for printing that matches printing settings for a job scheduled for execution following the completion of cleaning to be started.

(Condition 4): The printheads should be added as the cleaning target based on at least one of the following histories provided for each of the printheads: maintenance; discharge operation; and discharge failure inspection.

(Condition 5): When the printing portion includes printheads of different colors, and the cleaning mechanism is capable of cleaning printheads of the same color as a unit, the printhead can be added as the cleaning target within a range where the printhead does not require a longer cleaning duration than a printhead of a color that demands the longest cleaning duration among all the designated heads.

(1) Additional Head Selection Based on Condition 1

In the case where any printhead that satisfies Condition 1 among the remaining heads is added as a cleaning target, it is necessary to hold in advance printer-unique information specifying a cleaning-related configuration and functionality in the inkjet printing apparatus 10, including information such as the number and arrangement of printheads 241 in the printing portion 24, and the relationship between cleaning control modes and duration. The reason for this is that the reduction in cleaning duration when adding a specific printhead as a cleaning target depends on the printer-unique cleaning-related configuration and functionality.

Figure 10:
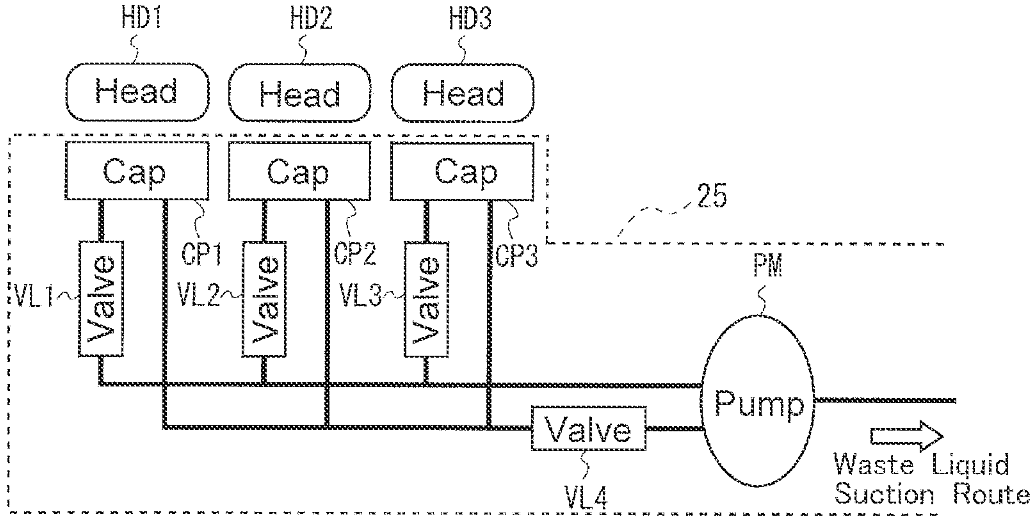
FIG. 10 is a schematic diagram describing the case where adding cleaning target heads results in a reduced cleaning duration in the embodiment.

For example, the cleaning mechanism 25 can be configured to switch between modes, as described in FIG. 10, allowing the cleaning mechanism 25 to perform ink suction (purge) either for individually each printhead or collectively for a plurality of printheads, thereby keeping printhead nozzles unclogged. In this case, the collective cleaning purge for the printheads might reduce the cleaning duration compared to the individual cleaning purge for each printhead. In the example shown in FIG. 10, the cleaning mechanism 25 includes caps CP1 to CP3, which face printheads HD1 to HD3, respectively, corresponding valves VL1 to VL3, which are connected to caps CP1 to CP3, respectively, valve VL4, which is commonly connected to caps CP1 to CP3, and a pump PM, which is connected to valves VL1 to VL4. The cleaning mechanism 25 also has flow paths that allow the pump PM to either individually suction ink from each printhead HDi (where i=1 to 3) via the corresponding cap CPi and valve VLi as waste liquid or collectively suction ink from three printheads HD1 to HD3 via valve VL4 as waste liquid. In this example, the time required for purging as cleaning is shorter when collectively suctioning ink from three printheads HD1 to HD3 via valve VL4 than when individually suctioning ink from two printheads HD1 and HD2 via valves VL1 and VL2, respectively.

In the present embodiment, the information that is used for determining whether the cleaning duration can be reduced by adding cleaning target printheads, namely, the printer-unique information, is a part of the cleaning-related information pre-stored in the auxiliary memory device 121. The portion of the auxiliary memory device 121 that stores the cleaning-related information corresponds to the cleaning-related information holding portion 157 in the functional block diagram shown in FIG. 7.

It should be noted that when adding any printheads as cleaning targets does not reduce the cleaning duration, but adding specific printheads does not increase the cleaning duration, and, for example, maintaining the printheads in a satisfactory state enhances printing efficiency or quality, the printheads may be selected as additional heads based on Condition 1.

Figure 11:
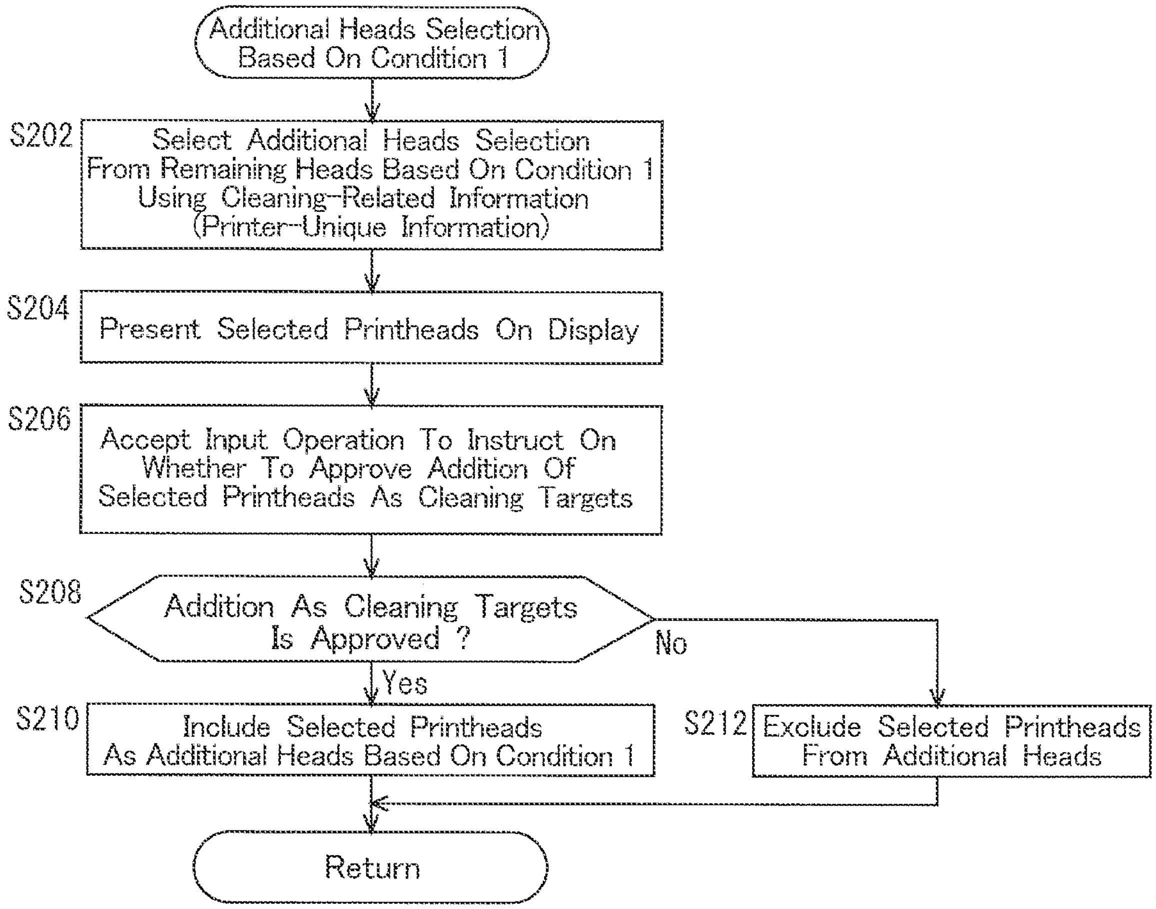
FIG. 11 is a flowchart describing a variant of additional head selection based on Condition 1 within an additional head selection stage in the cleaning process shown in FIG. 9.

On the other hand, the inkjet printing apparatus 10 stops the printing operation during the cleaning operation, and therefore it is desirable to allow the user to change the method of selecting an additional head based on Condition 1 if the user prioritizes saving time or wishes to complete printing tasks quickly. FIG. 11 is a flowchart describing a configuration example for such a scenario, which is a variant of the additional head selection based on Condition 1 among all options for additional head selection in the cleaning process shown in FIG. 9. As shown in FIG. 11, in this variant, additional heads meeting Condition 1 are selected from the remaining heads using the printer-unique information included in the cleaning-related information (step S202), and thereafter the selected additional heads are presented on the display portion 123 (step S204), allowing the user to instruct on whether to include the additional heads presented on the display portion 123 as cleaning targets through input operations using the keyboard 124 and the mouse 125 (step S206). More specifically, in this variant, selecting printheads to be included as cleaning targets from the remaining heads based on Condition 1 does not automatically include any printhead selected as a cleaning target from the remaining heads in accordance with the cleaning-related information, and the configuration of this variant includes the UI display portion and the UI operation portion allowing the user to instruct on whether to approve the addition of the selected printhead as the cleaning target (steps S204 and S206). When an input operation instructing the approval of the addition as the cleaning target is accepted, the selected printhead is considered as an additional head meeting Condition 1 (step S210). When an input operation instructing the disapproval of the addition as the cleaning target is accepted, the selected printhead is not included as an additional head (step S212), resulting in an empty set with no additional heads meeting Condition 1.

It should be noted that the UI display portion and the UI operation portion allowing such user instructions may also be provided for cases where printheads (additional heads) to be included as cleaning targets are selected from the remaining heads based on any of Conditions 2 to 5. In such a configuration, when an input operation that instructs the disapproval of the addition of an additional head selected based on any of Conditions 1 to 5 as a cleaning target is accepted, the additional head instructed for disapproval is excluded from a group of additional heads to be cleaned by the cleaning mechanism 25. In this case, cleaning is executed on all additional heads other than the excluded additional head (those being selected based on conditions other than the one used for the excluded additional head), as well as on the designated heads.

(2) Additional Head Selection Based on Condition 2

When the width of the printing paper PA (simply referred to below as the "paper width") is narrower than the width of the printhead array (see the "preceding job" depicted in FIG. 14 to be described later), some printheads do not discharge ink during a printing operation. In this case, the printheads that discharge no ink can be maintained in a satisfactory state through compulsory maintenance. On the other hand, when designated heads, namely, cleaning target printheads, are determined based on defect information LI obtained from an image of an inspection pattern printed on the printing paper PA (see 172 in FIGS. 7 and S124 in FIG. 9), any printheads arranged outside the paper width do not discharge ink, and therefore, as for such printheads, discharge state information, such as the defect information LI, cannot be obtained. However, when the width of the printhead array is narrower than the paper width, additional heads are selected based on Condition 2 by referencing job information included in the cleaning-related information, with the result that decapped printheads that are not intended to be cleaned by purging or suchlike are also included as cleaning targets. This keeps the printheads in a satisfactory state, leading to a reduction in cleaning frequency and consequently ensuring the maintenance of high printing throughput and quality.

Figure 12:
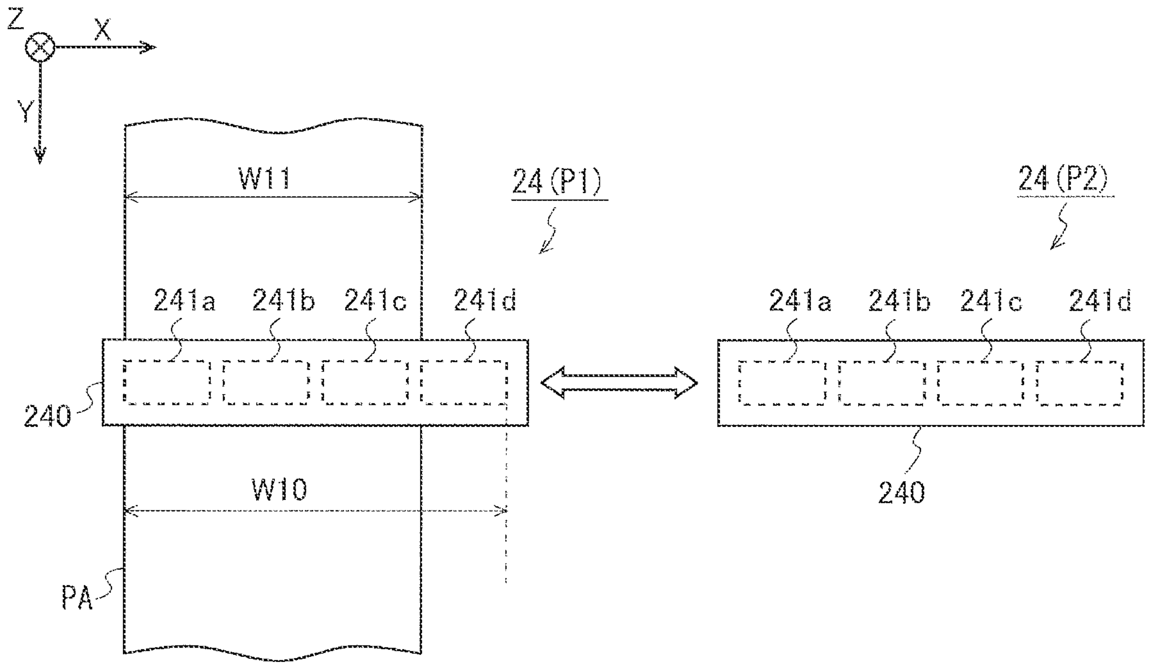
FIG. 12 is a top view conceptually illustrating the printing portion and printing paper in the embodiment.
Figure 13:
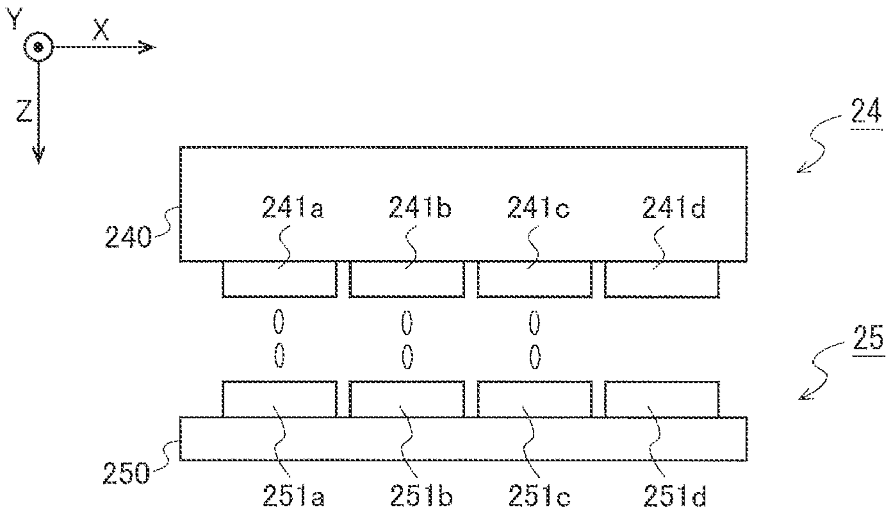
FIG. 13 is a side view conceptually illustrating the printing portion and a cleaning mechanism in the embodiment.

More detailed descriptions will be provided with reference to FIGS. 12 and 13. FIG. 12 is a conceptual top view of the printing portion 24 and the printing paper PA, and FIG. 13 is a conceptual side view of the printing portion 24 and the cleaning mechanism 25.

As shown in FIG. 12, the printing portion 24 is located above the printing paper PA. The printing portion 24 includes a head holding plate 240 and a plurality of printheads 241 (first to fourth printheads 241*a* to 241*d*) arranged in a row along a bottom surface of the head holding plate 240 in a paper width direction X of the printing paper PA. The printing paper PA is conveyed in a conveyance direction Y. The paper width direction X and the conveyance direction Y are perpendicular to a vertical direction Z.

The printing portion 24 is capable of moving between printing position P1 directly above the printing paper PA and cleaning position P2 situated apart from printing position P1 in the paper width direction X. Although not shown in FIG. 12, the cleaning mechanism 25 is located below the printing portion 24 in cleaning position P2.

The printing portion 24 is capable of printing on printing paper PA with a width W10 corresponding to the combined dimension of the first to fourth printheads 241*a* to 241*d* in the paper width direction X. However, printing paper PA with a width W11 narrower than the width W10 can also be used. In the case of printing on the printing paper PA with the narrower width W11, only the first to third printheads 241*a* to 241*c* are used for printing, and the fourth printhead 241*d* is not used.

FIG. 13 is a conceptual side view of the printing portion 24 and the cleaning mechanism 25, as viewed in a "−Y" direction opposite to the conveyance direction Y of the printing paper PA. The cleaning mechanism 25 has a plurality of caps 251 (first to fourth caps 251*a* to 251*d*) provided on a top surface of a holding plate 250. The first to fourth caps 251*a* to 251*d* correspond to the previously described first to fourth printheads 241*a* to 241*d*, respectively. The cleaning mechanism 25 is capable of moving up and down between capping and decapping heights. The caps 251 cover the printheads 241 at the capping height and are positioned apart from the printheads 241 at the decapping height, which is slightly below the capping height. At the capping height, the caps 251 cover the printheads 241 to prevent nozzle drying of the printheads 241. Moreover, when the caps 251 are at the decapping height, the printheads 241 are cleaned by purging ink droplets toward the caps 251. Alternatively, an unillustrated wiper may be used to wipe and clean nozzle faces of the printheads 241. In FIG. 13, the cleaning mechanism 25 is positioned at the decapping height.

Normally, the cleaning mechanism 25 cleans the first to third printheads 241*a* to 241*c* after printing is performed on the printing paper PA with the narrower width W11. However, as shown in FIG. 13, while the first to third printheads 241*a* to 241*c* are being cleaned, the fourth printhead 241*d*, which is not a cleaning target, is left decapped. Accordingly, when the period of cleaning the first to third printheads 241*a* to 241*c*, which are designated heads, is expected to exceed the time during which the fourth printhead 241*d* not included among the designated heads can resist drying, the fourth printhead 241*d* is selected as an additional head. That is, the fourth printhead 241*d* undergoes cleaning (purging) concurrently with the first to third printheads 241*a* to 241*c*. Conversely, when the cleaning period for the first to third printheads 241*a* to 241*c*, which are the designated heads, is expected to be shorter than the drying resistance time of the fourth printhead 241*d* not included among the designated heads, the fourth printhead 241*d* is not selected as an additional head and remains uncleaned. Such control maintains the fourth printhead 241*d* not included among the designated heads in a satisfactory state without unnecessarily increasing the frequency of cleaning.

(3) Additional Head Selection Based on Condition 3

Figure 14:
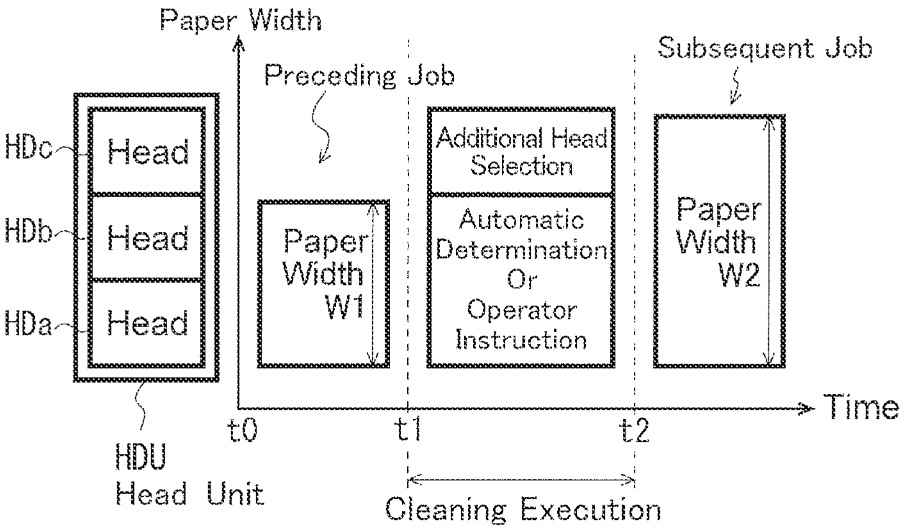
FIG. 14 is a schematic diagram describing cleaning targets in the case where paper width is changed in the embodiment.

For printing that matches printing settings (for example, paper width, paper type, and printing quality requirements) for the subsequent printing job to be executed following the completion of cleaning to be started, any printheads to be added as cleaning targets are selected as additional heads. This maintains each printhead in a satisfactory state and reduces the cleaning frequency, thereby ensuring the maintenance of high printing throughput and quality. Consider an example as shown in FIG. 14 where paper widths W1 and W2 are used for preceding and subsequent jobs, respectively, the preceding job is a printing job immediately preceding cleaning to be started, and paper width W2 is wider than paper width W1, printheads not used in the preceding job are used in the subsequent job. In this case, additional heads are selected based on Condition 3 with reference to job information included in the cleaning-related information (more specifically, information that specifies the printing settings for the subsequent job) so as to be included as cleaning targets. This renders it possible to execute the subsequent job satisfactorily and thereby inhibit reductions in printing throughput and quality. Moreover, when the subsequent job requires higher printing quality than the preceding job, or when the subsequent job is less tolerant of nozzle defects than the preceding job, additional heads are selected based on Condition 3 with reference to the job information included in the cleaning-related information. This renders it possible to execute the subsequent job satisfactorily and thereby inhibit reductions in printing throughput and quality. Note that in this case, the information for the subsequent job can be used to modify determination criteria of the nozzle defect determination portion 171 in the cleaning startup portion 161, allowing for more stringent determinations.

(4) Additional Head Selection Based on Condition 4

Printheads to be added as cleaning targets are selected as additional heads from the remaining heads based on Condition 4 using discharge operation and maintenance histories included in the cleaning-related information. This maintains each printhead in a satisfactory state and reduces the cleaning frequency, thereby ensuring the maintenance of high printing throughput and quality. In the present embodiment, for example, any printheads that fall within the following categories (a) to (f) are selected as additional heads from the remaining heads based on Condition 4. Note that in this case, the cleaning-related information holding portion 157 is used as a history information memory portion.

(a) Printheads for which a predetermined period of time has lapsed since the execution of the last cleaning.

(b) Printheads whose ink discharge amount or discharge operation time has exceeded an upper limit value or has not reached a lower limit value.

(c) Printheads for which a predetermined period of time has lapsed since the last ink discharge operation.

(d) Printheads for which the frequency of nozzle defect detection has exceeded a predetermined value.

(e) Printheads whose total discharge count and/or total discharge time have exceeded respective upper limits.

(f) Printheads with significant adhering mist or the like from upstream heads that share the same lines as the printheads over the conveyance path or from other surrounding heads.

(5) Additional Head Selection Based on Condition 5

When the printing portion 24 includes printheads of different colors, and the cleaning mechanism is capable of cleaning printheads of the same color as a unit, if there is a printhead that can be added as a cleaning target within a range where the printhead does not require a longer cleaning duration than a printhead of a color that demands the longest cleaning duration among all designated heads, the printhead is selected as an additional head based on Condition 5. Accordingly, such additional head selection uses the printer-unique information, including information that specifies the configurations of the printing portion 24 and the cleaning mechanism 25. In an inkjet printing apparatus capable of color printing, such additional head selection based on Condition 5 maintains each printhead in a satisfactory state and reduces the cleaning frequency, thereby ensuring the maintenance of high printing throughput.

Figure 15:
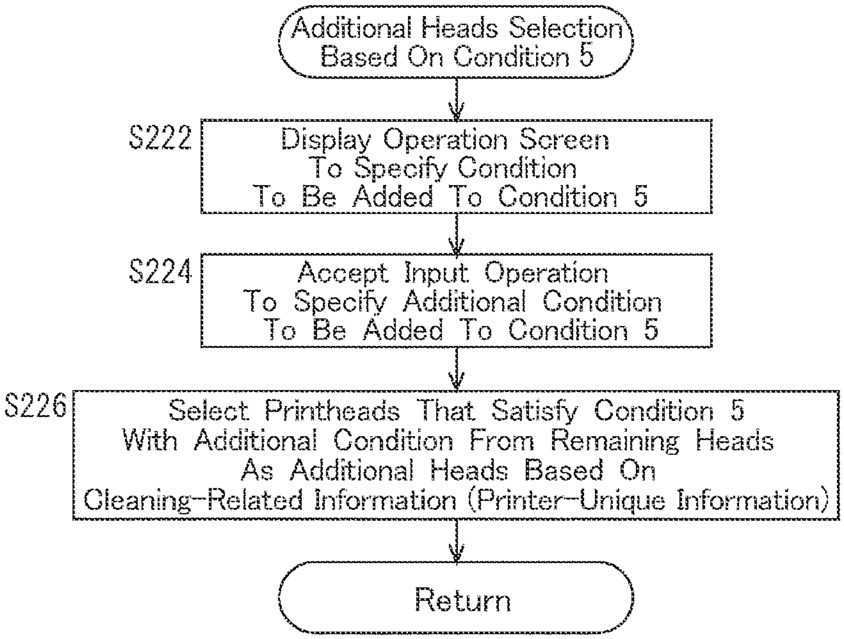
FIG. 15 is a flowchart describing a variant of additional head selection based on Condition 5 within the additional head selection stage in the cleaning process shown in FIG. 9.

However, additional head selection based on Condition 5 might lead to excessive ink consumption. Accordingly, when prioritizing the minimization of ink consumption, it is preferable for the user to designate a condition to be added to Condition 5 to limit any increase in ink consumption resulting from additional head selection based on Condition 5. For example, it is preferable to perform additional head selection based on Condition 5 in accordance with the procedure as shown in FIG. 15. In the example shown in FIG. 15, initially, the display portion 123 displays an operation screen to specify a condition to be added to Condition 5 (simply referred to below as an "additional condition") (step S222), and an input operation that specifies the additional condition on the operation screen using the keyboard 124 and the mouse 125 is then accepted (step S224). Next, printheads that satisfy Condition 5 with the additional condition are selected as additional heads from the remaining heads based on the printer-unique information included in the cleaning-related information (step S226). In the configuration that allows additional head selection based on Condition 5 in this manner, properly setting the additional condition renders it possible to avoid excessive ink consumption. Note that at step S222 above, the display portion 123 preferably displays conditions that can be added to Condition 5, such as the upper limits on the number of additional heads and ink consumption per unit time (estimated value), as well as useful information that provides tips for the user to specify appropriate additional conditions.

As can be appreciated from the descriptions above, among the components of the main control portion 151 shown in FIGS. 5 to 7, the maintenance content determination portion 152 is implemented by steps S104 to S108 in FIG. 8 and steps S122 to S128 in FIG. 9, the cleaning startup portion 161 is implemented by step S108 in FIG. 8 and steps S122 to S128 in FIG. 9, the UI display portion 173 and the UI operation portion 174 are implemented by steps S126 and S128, respectively, in FIG. 9, the nozzle defect determination portion 171 and the cleaning target head determination portion 172 are implemented by step S124 in FIG. 9, the additional head selection portion 162 is implemented by step S130 in FIG. 9, and the cleaning execution control portion 163 is implemented by step S132 in FIG. 9.

<5.2 Other Examples of Cleaning Process>

In the present embodiment, whether cleaning is necessary is either automatically determined by the CPU 111 or manually instructed by the user based on their determination. Specifically, in the former case, the determination is made by the nozzle defect determination portion 171 realized in software by the CPU 111, while in the latter case, the instruction is provided through an input operation using the keyboard 124 and the mouse 125 based on information displayed on the display portion 123 (see FIG. 7). The cleaning process shown in FIG. 9 can deal with both of these cases (steps S122 to S128), and in either case, it is assumed that whether cleaning is necessary is determined when maintenance is determined to be necessary upon acquisition of discharge state detection results based on an inspection pattern image printed after each job (see steps S102 to S108 in FIG. 8). However, in some cases, the user may be required to provide an instruction (cleaning start instruction) to indicate that cleaning is necessary through an input operation, at different times from the above. In cleaning processes described below with reference to FIGS. 16 to 18, the cleaning start instruction is provided through a user input operation at a different time from the above.

Figure 16:
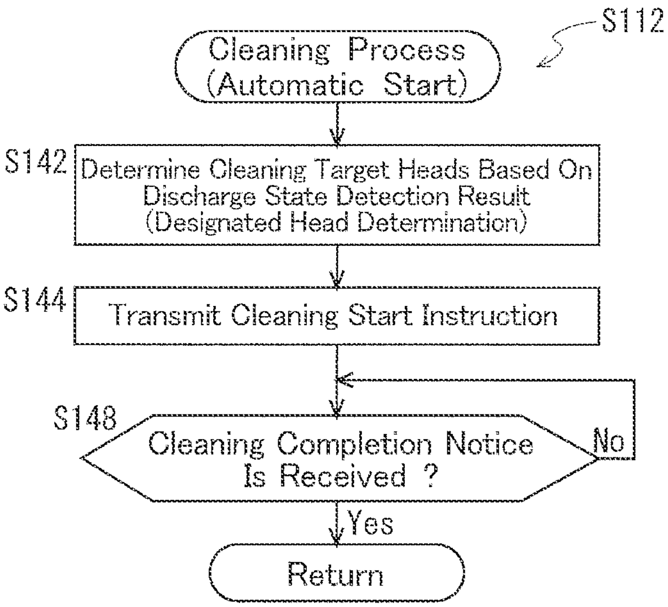
FIG. 16 is a flowchart illustrating the procedure for automatically starting cleaning in another example of the cleaning process in the embodiment.
Figure 17:
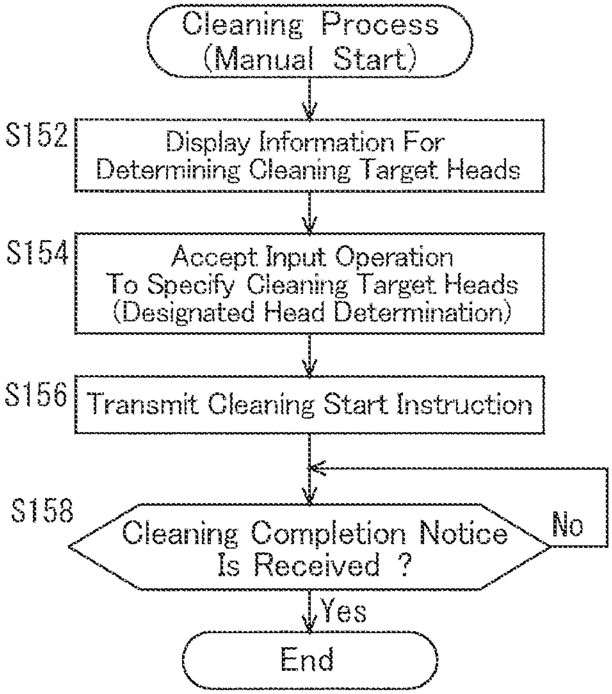
FIG. 17 is a flowchart illustrating the procedure for manually starting cleaning in the another example of the cleaning process in the embodiment.
Figure 18:
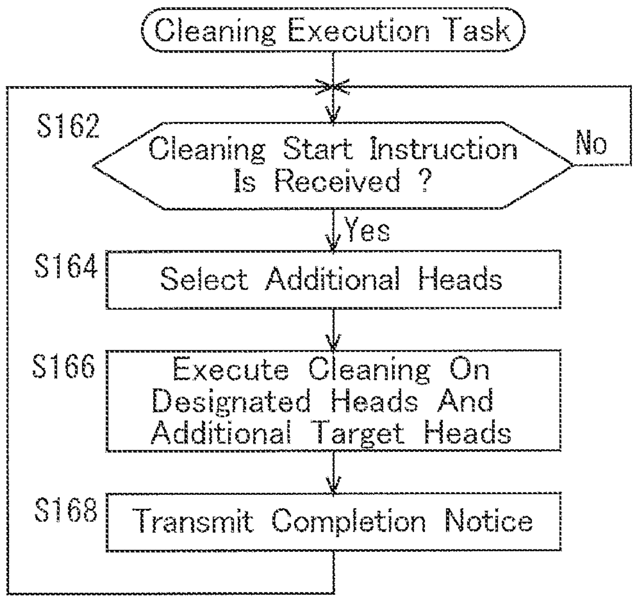
FIG. 18 is a flowchart illustrating the procedure for a cleaning execution task in the another example of the cleaning process in the embodiment.

FIGS. 16 to 18 are flowcharts illustrating another example of the cleaning process in the present embodiment. This example involves two different cleaning processes executed in concurrent under an operating system (abbreviated below as an "OS") running in the printing control device 100 shown in FIG. 4. One is a cleaning task (referred to below as an "automatic start cleaning task") in which the CPU 111 automatically determines whether cleaning is necessary. The other is a cleaning task (referred to below as a "manual start cleaning task") in which the start of cleaning is instructed through a user input operation. Moreover, this example also includes a cleaning execution task, as shown in FIG. 18, which is activated as a process independent of the two processes mentioned above when the inkjet printing apparatus 10 is powered on and continues to reside until the inkjet printing apparatus 10 is powered off. Note that the OS has a process management function and provides system functions for inter-process communication, etc.

FIG. 16 illustrates the procedure for the automatic start cleaning task, which corresponds to step S112 in FIG. 8.

When it is determined at step S108 in FIG. 8 that cleaning is necessary, the cleaning task in FIG. 16 is executed following step S111. In this cleaning task, the CPU 111 operates as described below.

Initially, based on the discharge state detection result (specifically, the defect information LI) obtained at step S104 in FIG. 8, designated heads, namely, cleaning target printheads, are determined (step S142), and then a cleaning start instruction Ics along with information that specifies the designated heads (referred to below as "designated head information"), is transmitted to the process for the cleaning execution task (FIG. 18) (step S144). Thereafter, a standby state is maintained until a cleaning completion notice is received from the process for the cleaning execution task (step S148). When the cleaning completion notice is received during the standby state, the cleaning task routine of FIG. 16 ends, and the procedure returns to the process routine of FIG. 8, where processing from step S113 onward is executed.

FIG. 18 is a flowchart illustrating the procedure for the cleaning execution task. When activated, the process for the cleaning execution task is kept in a standby state until a cleaning start instruction Ics is received (step S162). The cleaning start instruction Ics is received during the standby state when transmitted either at step S144 in FIG. 16 or at step S156 in FIG. 17 to be described later. At this time, designated head information, which is transmitted along with the cleaning start instruction Ics, is also received. Next, printheads to be chosen as cleaning targets along with designated heads are selected as additional heads from remaining heads, which are all printheads excluding printheads (designated heads) specified by the designated head information (step S164). Details of the additional head selection are the same as those for step S130 in FIG. 9. Thereafter, the designated heads and the additional heads (more specifically, the additional target heads that correspond to a union set of additional heads under the respective Conditions 1 to 5 described earlier) are cleaned (step S166). As a result, the cleaning execution task corresponding to one cleaning start instruction Ics ends, and the procedure returns to step S162, where a standby state is maintained until the next cleaning start instruction Ics is received.

FIG. 17 illustrates the procedure for the manual start cleaning task, which is executed in the process (referred to below as the "manual start process") different from and executed in concurrent with the process in which the cleaning task in FIG. 16 is executed. Specifically, once the user instructs to start cleaning through an input operation using the keyboard 124 and the mouse 125, the process different from that including the execution of the cleaning task in FIG. 16 is started anew as the manual start process, where the cleaning task in FIG. 17 is executed. In this cleaning task, the CPU 111 operates as described below.

Initially, the display portion 123 (UI display portion 173) displays information for the user to determine designated heads, namely, cleaning target printheads (step S152). The information used here for the determination indicates cleaning and discharge operation histories for each printhead 241 and also includes other information that provides tips for determining which printheads should be cleaning targets. Once the user performs an input operation based on the above information to choose cleaning targets, namely, designated heads, the input operation is accepted (step S154). Next, a cleaning start instruction Ics, along with information that specifies the designated heads (designated head information), is transmitted to the process for the cleaning execution task (FIG. 18) (step S156). Thereafter, a standby state is maintained until a cleaning completion notice is received from the process for the cleaning execution task (step S158). Once the cleaning completion notice is received during the standby state, the process for the cleaning task in FIG. 17, i.e., the manual start process, ends.

In this manner, for the manual start cleaning task in FIG. 17, each time the user performs an input operation to provide a cleaning start instruction, a new manual start process is started for executing the cleaning task, and once the manual start cleaning task ends, the manual start process also ends. Note that the printing operation is assumed to be at a halt when the manual process is activated, and the input operation to provide the cleaning start instruction is not accepted during printing or while the printing paper PA is being conveyed.

Note that in this example, as can be appreciated from the descriptions above, among the components of the main control portion 151 shown in FIGS. 5 to 7, the maintenance content determination portion 152 is implemented by steps S104 to S108 in FIG. 8, steps S142 and S144 in FIG. 16, steps S152 to S156 in FIG. 17, and S162 in FIG. 18, the cleaning startup portion 161 is implemented by step S108 in FIG. 8, steps S142 and S144 in FIG. 16, steps S152 to S156 in FIG. 17, and S162 in FIG. 18, the nozzle defect determination portion 171 and the cleaning target head determination portion 172 are implemented by step S142 in FIG. 16, the UI display portion 173 and the UI operation portion 174 are implemented by steps S152 and S154, respectively, in FIG. 17, the nozzle defect determination portion 171 and the cleaning target head determination portion 172 are implemented by step S142 in FIG. 16, the additional head selection portion 162 is implemented by step S164 in FIG. 18, and the cleaning execution control portion 163 is implemented by step S166 in FIG. 18.

<6. Effects>

In the present embodiment as described above, cleaning is executed on the designated heads determined as cleaning targets based on the discharge state detection result (defect information LI) obtained from the printed inspection pattern image, and also on the additional heads (additional target heads), which are printheads chosen from the remaining heads, i.e., all printheads excluding the designated heads, and added as cleaning targets to enhance printing throughput or quality. This enables the inkjet printing apparatus to perform cleaning more efficiently and thereby enhance printing throughput and quality when compared to conventional inkjet printing apparatuses. Moreover, the additional heads are automatically selected based on the cleaning-related information, including the discharge operation history, the maintenance history, the job information, and the printer-unique information. Thus, the additional heads to be included as the cleaning targets can be selected accurately without relying on human skill levels or similar factors.

<7. Variants>

The present invention is not limited to the above embodiment and, further, various modifications can be made without departing from the scope of the invention. For example, in the case of the inkjet printing apparatus according to the embodiment, the inspection pattern is printed upon completion of each job, and the determination of whether maintenance and cleaning are necessary is based on the printed image of the inspection pattern (see FIG. 8). However, the timing of determining whether cleaning is necessary is not limited to this, and, for example, the determination of whether cleaning is necessary may be based on a discharge state detection result (defect information LI) obtained from an image printed when any printing interruption is caused by an issue with the main printer unit 200. Moreover, in the case where a job is executed and still in progress during the printing of an inspection pattern, the determination of whether maintenance and cleaning are necessary may be based on inspection results for an inspection pattern printed at the time closest to the interruption or pause in image printing for the job.

Furthermore, in the embodiment, the additional heads are selected based on each of Conditions 1 to 5 described earlier, setting a union set of additional heads as additional target heads (cleaning targets) for the respective Conditions 1 to 5. Alternatively, the additional heads may be selected for each of one or more conditions chosen from among Conditions 1 to 5, setting a union set of additional heads as additional target heads based on the respective selected conditions.

Furthermore, in the embodiment, two examples of the cleaning process (illustrated in FIG. 9 and in FIGS. 16 to 18) have been described, but any configuration that combines these two examples of the cleaning process may be employed without departing from the spirit of the present invention and without causing contradictions.

Furthermore, in the embodiment, the check pattern is printed with printheads and then read to obtain information based on which to determine printheads to be cleaned. However, printhead nozzle faces or the flying state of ink droplets discharged from printheads may be directly observed with optical elements to obtain observation results based on which to determine printheads to be cleaned.

DESCRIPTION OF THE REFERENCE CHARACTERS

10 inkjet printing apparatus
24 printing portion
25 cleaning mechanism
100 printing control device
150 control portion
151 main control portion
152 maintenance content determination portion
153 printing control portion
156 inspection result holding portion
157 cleaning-related information holding portion
161 cleaning startup portion
162 additional head selection portion
163 cleaning execution control portion
165 printing execution control portion
171 nozzle defect determination portion
172 cleaning target head determination portion
173 UI display portion
174 UI operation portion
175 cleaning instruction reception portion
200 main printer unit
210 conveyance mechanism
241 inkjet head (printhead)
300 image inspection device
310 imaging portion
320 image inspection computer

The invention claimed is:

1. An inkjet printing apparatus comprising:

a conveyance mechanism configured to convey a printing medium;

a printing portion including a plurality of printheads for discharging ink onto the printing medium;

a cleaning mechanism capable of selectively cleaning the plurality of printheads;

a printing execution control portion configured to perform printing on the printing medium by causing the conveyance mechanism to convey the printing medium and causing the printing portion to discharge the ink onto the printing medium;

a cleaning execution control portion configured to cause the cleaning mechanism to selectively clean the plurality of printheads;

a cleaning startup portion configured to, when cleaning should be executed, based on discharge state information for the plurality of printheads, output a cleaning start instruction specifying a printhead to be a cleaning target as a designated head; and an additional head selection portion configured to, when the cleaning start instruction is outputted, select a printhead to be chosen as a cleaning target along with the designated head as an additional head from remaining heads based on at least one of printer-unique information specifying a cleaning-related configuration or functionality, printing job-related information, dried state information for the remaining heads, a discharge operation history for the remaining heads, and a maintenance history for the remaining heads, the remaining heads being all of the plurality of printheads excluding the designated head, wherein the additional head selected from the remaining heads by the additional head selection portion is a printhead that contributes to either reducing cleaning frequency or maintaining normal ink discharge, or both, when the printhead is chosen as the cleaning target along with the designated head, when the cleaning start instruction is outputted, the printing execution control portion stops the printing on the printing medium until cleaning started by the cleaning start instruction ends, and when the additional head selection portion selects the additional head in response to the cleaning start instruction, the cleaning execution control portion causes the cleaning mechanism to clean the designated head and the additional head.

2. The inkjet printing apparatus according to claim 1, wherein the additional head selected from the remaining heads by the additional head selection portion based on the printer-unique information is a printhead that reduces a cleaning duration when the printhead is included as the cleaning target compared to when only the designated head is cleaned.

3. The inkjet printing apparatus according to claim 1, wherein the additional head selected from the remaining heads by the additional head selection portion based on the printer-unique information is a printhead that contributes to reducing cleaning frequency or maintaining normal ink discharge without increasing a cleaning duration when the printhead is included as the cleaning target compared to when only the designated head is cleaned.

4. The inkjet printing apparatus according to claim 1, wherein the additional head selection portion selects the additional head based on the printing job-related information in accordance with printing settings for a printing job to be executed after the designated head is cleaned.

5. The inkjet printing apparatus according to claim 4, wherein the additional head selection portion selects the additional head in accordance with a width of the printing medium as identified by the printing settings.

6. The inkjet printing apparatus according to claim 4, wherein the additional head selection portion selects the additional head in accordance with printing quality as identified by the printing settings.

7. The inkjet printing apparatus according to claim 1, wherein, when the printing portion includes printheads of different colors and the cleaning mechanism is capable of cleaning printheads of the same color as a unit, the additional head selection portion selects the additional head from the remaining heads based on the printer-unique information within a range where the selected additional head does not require a longer cleaning duration than a printhead of a color that demands the longest cleaning duration among all of the designated heads.

8. The inkjet printing apparatus according to claim 1, further comprising an operation portion configured to accept a user input operation, wherein, the operation portion accepts an input operation to designate a condition to be added for the additional head selection portion to select the additional head, and the additional head selection portion selects the additional head such that the condition designated by the input operation is satisfied.

9. The inkjet printing apparatus according to claim 8, wherein, when selecting a printhead as the additional head from the remaining heads and including the printhead as the cleaning target to reduce a cleaning duration compared to a cleaning duration required for cleaning only the designated head, the operation portion accepts an input operation to designate a reduction time from the cleaning duration required for cleaning only the designated head, and the additional head selection portion selects the additional head such that including the additional head as the cleaning target results in a greater reduction time from the cleaning duration required for cleaning only the designated head than the designated reduction time.

10. The inkjet printing apparatus according to claim 8, wherein, the operation portion accepts an input operation to designate a maximum number of printheads to be selected as the additional heads; and the additional head selection portion selects the additional heads such that the number of printheads selected as the additional heads does not exceed the maximum number.

11. The inkjet printing apparatus according to claim 1, wherein, the additional head selection portion includes:

a display portion configured to present additional heads selected based on at least one of the printer-unique information, the printing job-related information, the dried state information for the remaining heads, the discharge operation history for the remaining heads, and the maintenance history for the remaining heads, and an operation portion configured to accept a user input operation, the operation portion accepts an input operation to instruct on whether to approve the additional heads presented by the display portion as the cleaning targets, and when the input operation instructs to disapprove any one head of the additional heads presented by the display portion as the cleaning target, the additional head selection portion excludes the any one head instructed for disapproval from the additional heads to be cleaned by the cleaning mechanism.

12. An inkjet printing apparatus comprising:

a conveyance mechanism configured to convey a printing medium;

a printing portion including a plurality of printheads for discharging ink onto the printing medium;

a cleaning mechanism capable of selectively cleaning the plurality of printheads;

a printing execution control portion configured to perform printing on the printing medium by causing the conveyance mechanism to convey the printing medium and causing the printing portion to discharge the ink onto the printing medium;

a cleaning execution control portion configured to cause the cleaning mechanism to selectively clean the plurality of printheads;

a cleaning startup portion configured to, when cleaning should be executed, based on discharge state information for the plurality of printheads, output a cleaning start instruction specifying a printhead to be a cleaning target as a designated head; and an additional head selection portion configured to, when the cleaning start instruction is outputted, select a printhead to be chosen as a cleaning target along with the designated head as an additional head from remaining heads based on at least one of printer-unique information specifying a cleaning-related configuration or functionality, printing job-related information, dried state information for the remaining heads, a discharge operation history for the remaining heads, and a maintenance history for the remaining heads, the remaining heads being all of the plurality of printheads excluding the designated head, wherein the additional head selected from the remaining heads by the additional head selection portion is a printhead that experiences deterioration due to drying when only the designated head is cleaned, when the cleaning start instruction is outputted, the printing execution control portion stops the printing on the printing medium until cleaning started by the cleaning start instruction ends, and when the additional head selection portion selects the additional head in response to the cleaning start instruction, the cleaning execution control portion causes the cleaning mechanism to clean the designated head and the additional head.

13. The inkjet printing apparatus according to claim 12, wherein the additional head selected from the remaining heads by the additional head selection portion is a printhead that discharges no ink during printing due to a combined dimension of the plurality of printheads in a width direction of the printing medium being greater than a width of the printing medium.

14. The inkjet printing apparatus according to claim 12, wherein the additional head selected from the remaining heads by the additional head selection portion is a printhead for which discharge failure is not detectable by printing a discharge failure detection test pattern due to a combined dimension of the plurality of printheads in a width direction of the printing medium being greater than a width of the printing medium.

15. An inkjet printing apparatus comprising:

a conveyance mechanism configured to convey a printing medium;

a printing portion including a plurality of printheads for discharging ink onto the printing medium;

a cleaning mechanism capable of selectively cleaning the plurality of printheads;

a printing execution control portion configured to perform printing on the printing medium by causing the conveyance mechanism to convey the printing medium and causing the printing portion to discharge the ink onto the printing medium;

a cleaning execution control portion configured to cause the cleaning mechanism to selectively clean the plurality of printheads;

a cleaning startup portion configured to, when cleaning should be executed, based on discharge state information for the plurality of printheads, output a cleaning start instruction specifying a printhead to be a cleaning target as a designated head;

an additional head selection portion configured to, when the cleaning start instruction is outputted, select a printhead to be chosen as a cleaning target along with the designated head as an additional head from remaining heads based on at least one of printer-unique information specifying a cleaning-related configuration or functionality, printing job-related information, dried state information for the remaining heads, a discharge operation history for the remaining heads, and a maintenance history for the remaining heads, the remaining heads being all of the plurality of printheads excluding the designated head; and a history information memory portion configured to accumulate information specifying at least one of histories of maintenance, discharge operation, and discharge failure inspection, for each of the plurality of printheads, wherein, the additional head selection portion selects the additional head from the remaining heads based on the information accumulated in the history information memory portion, when the cleaning start instruction is outputted, the printing execution control portion stops the printing on the printing medium until cleaning started by the cleaning start instruction ends, and when the additional head selection portion selects the additional head in response to the cleaning start instruction, the cleaning execution control portion causes the cleaning mechanism to clean the designated head and the additional head.

16. The inkjet printing apparatus according to claim 15, wherein the additional head selected from the remaining heads by the additional head selection portion based on the information accumulated in the history information memory portion is a printhead that satisfies at least one of the following conditions: a predetermined time period has lapsed since the last cleaning executed; an ink discharge amount or an ink discharge operating time has exceeded an upper limit or has not reached a lower limit; a predetermined time period has lapsed after the last ink discharge operation; and a discharge failure detection frequency has exceeded a predetermined value.

* * * * *